Oct. 14, 1941.  L. U. LARKIN  2,258,618
APPARATUS FOR THE MANUFACTURE OF FINNED STRUCTURES
Filed March 19, 1938   17 Sheets-Sheet 9
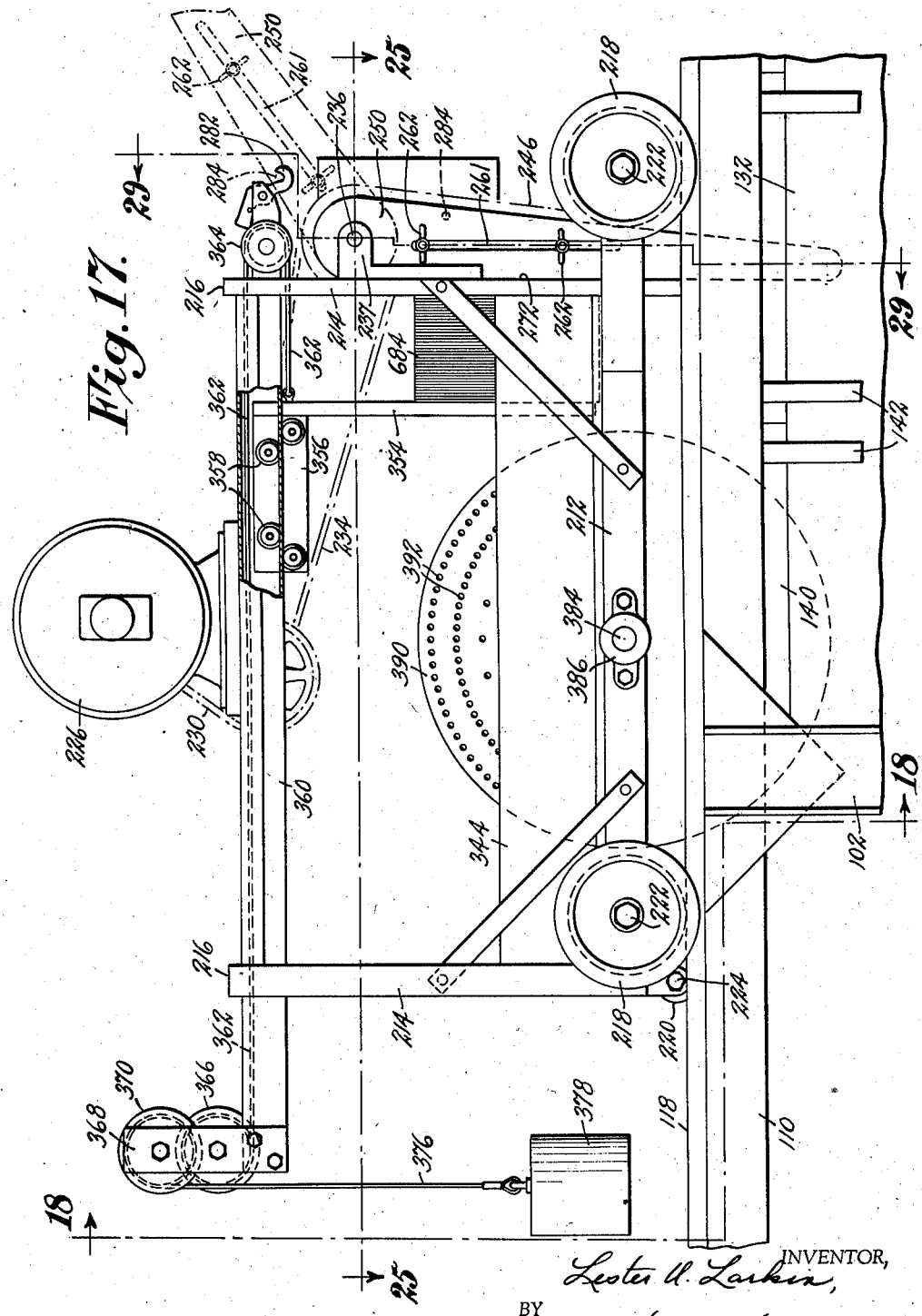

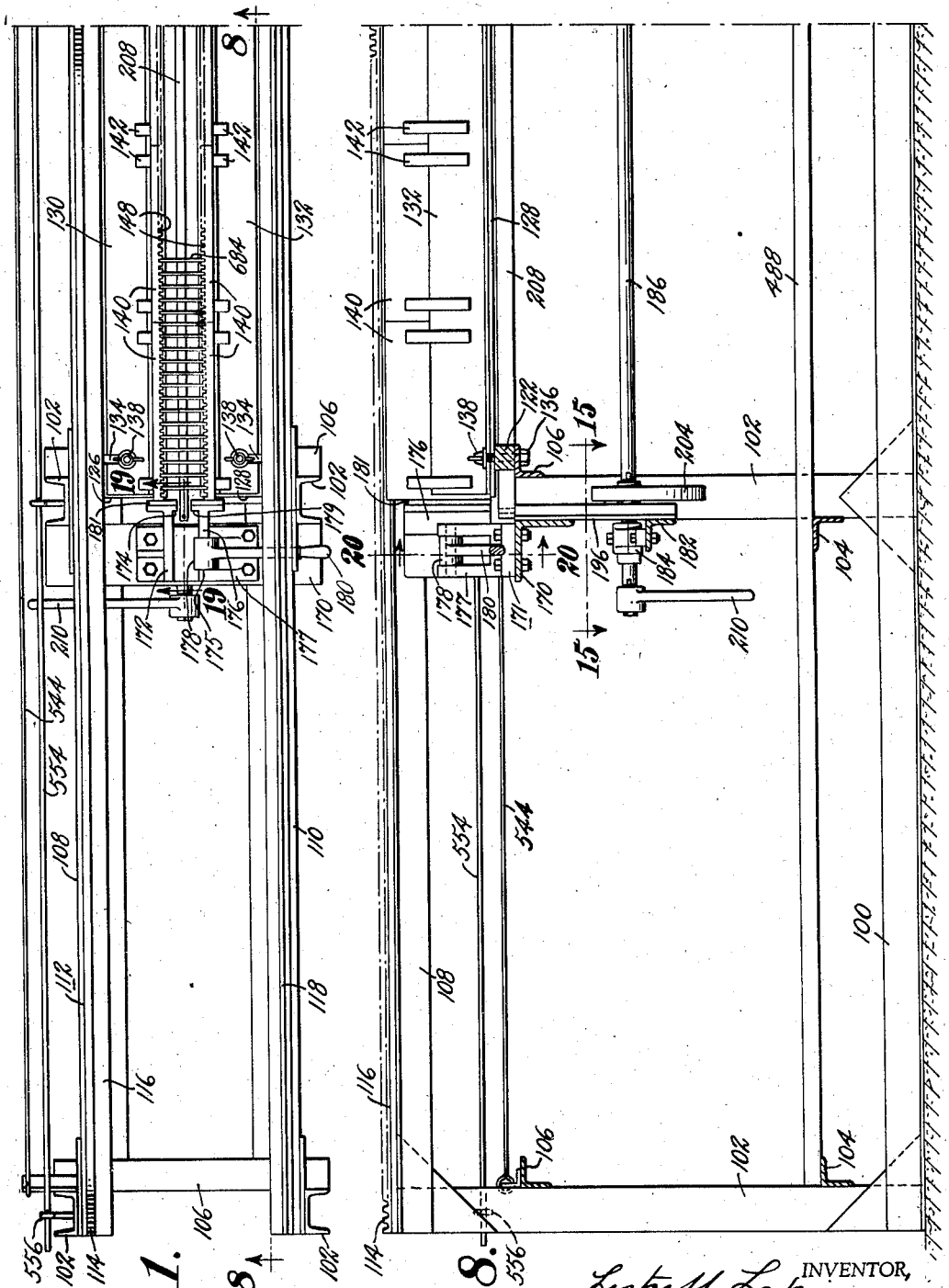

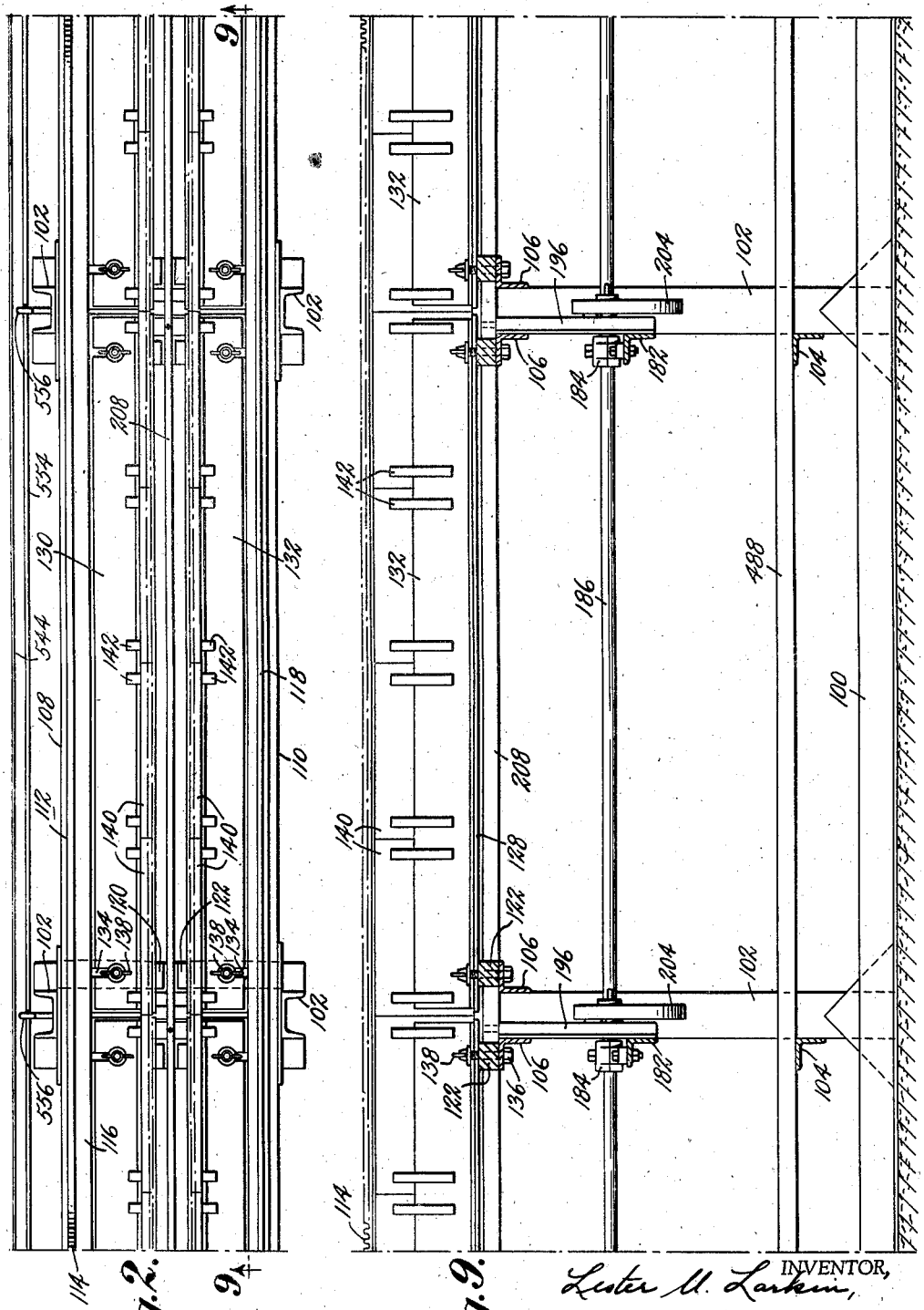

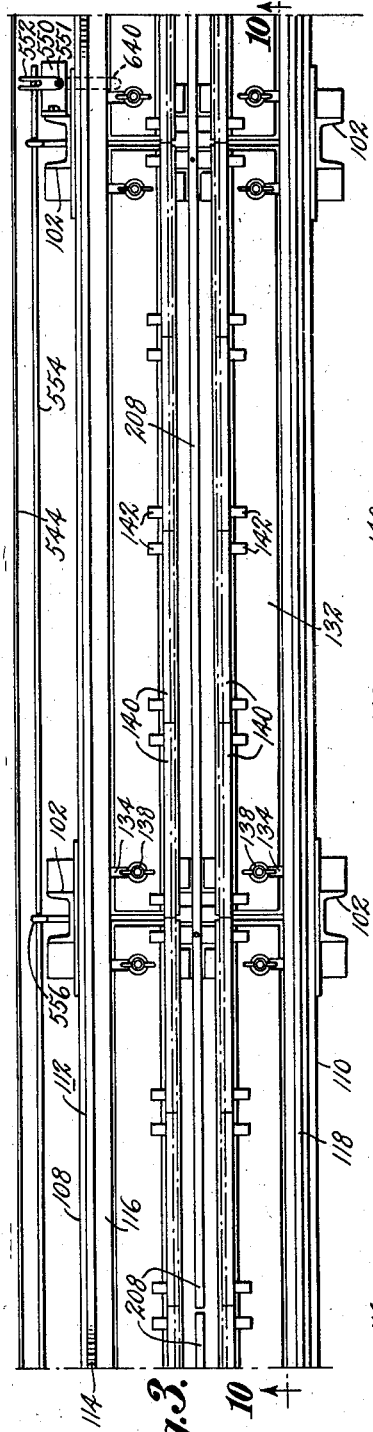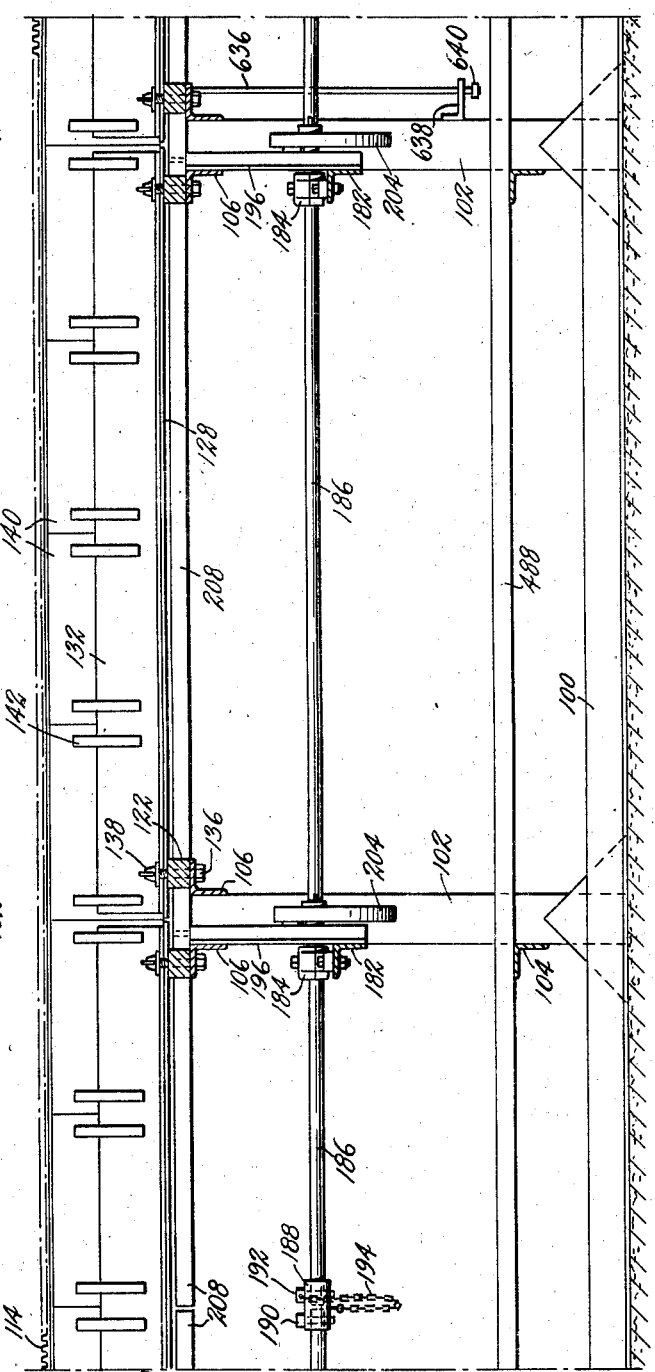

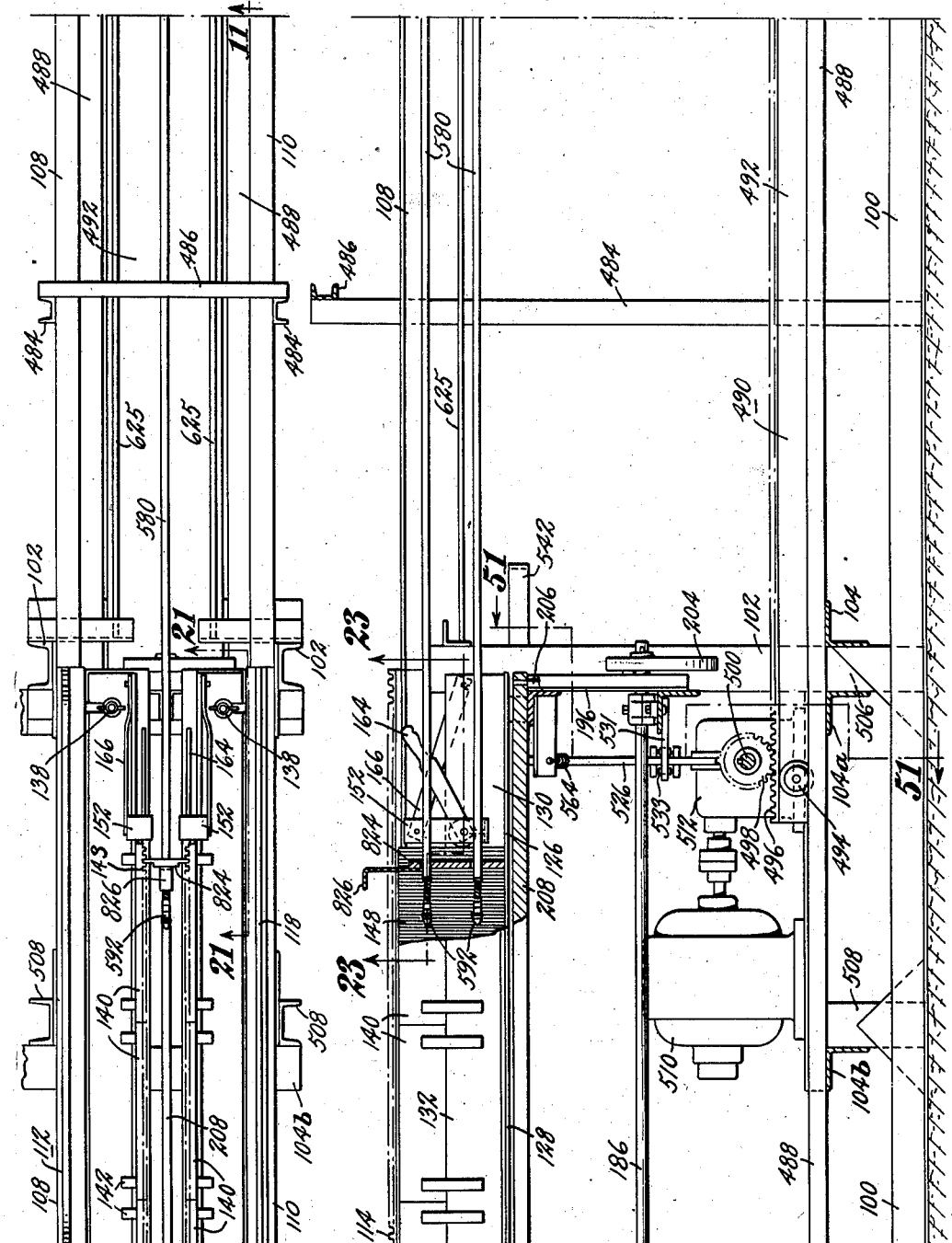

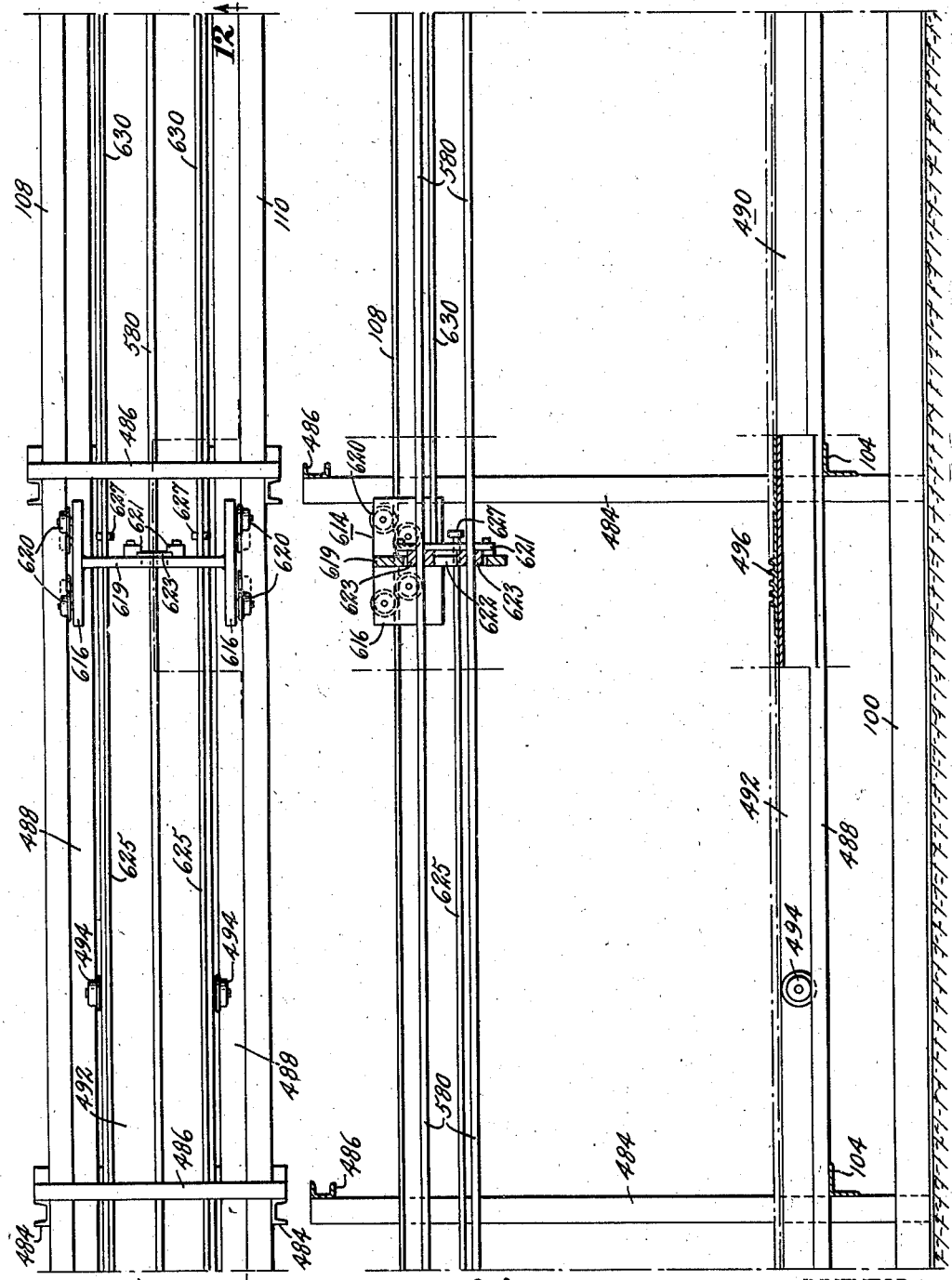

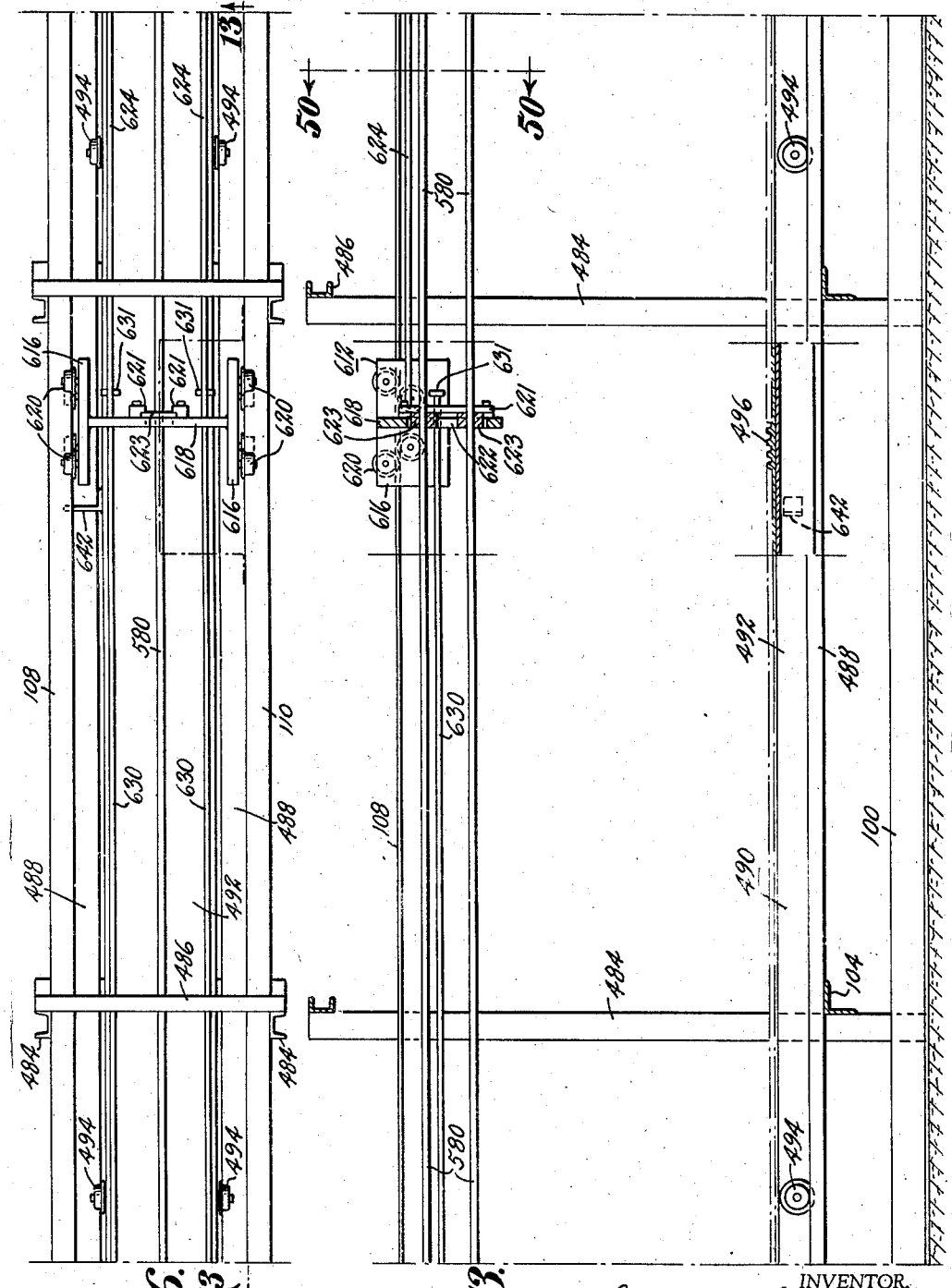

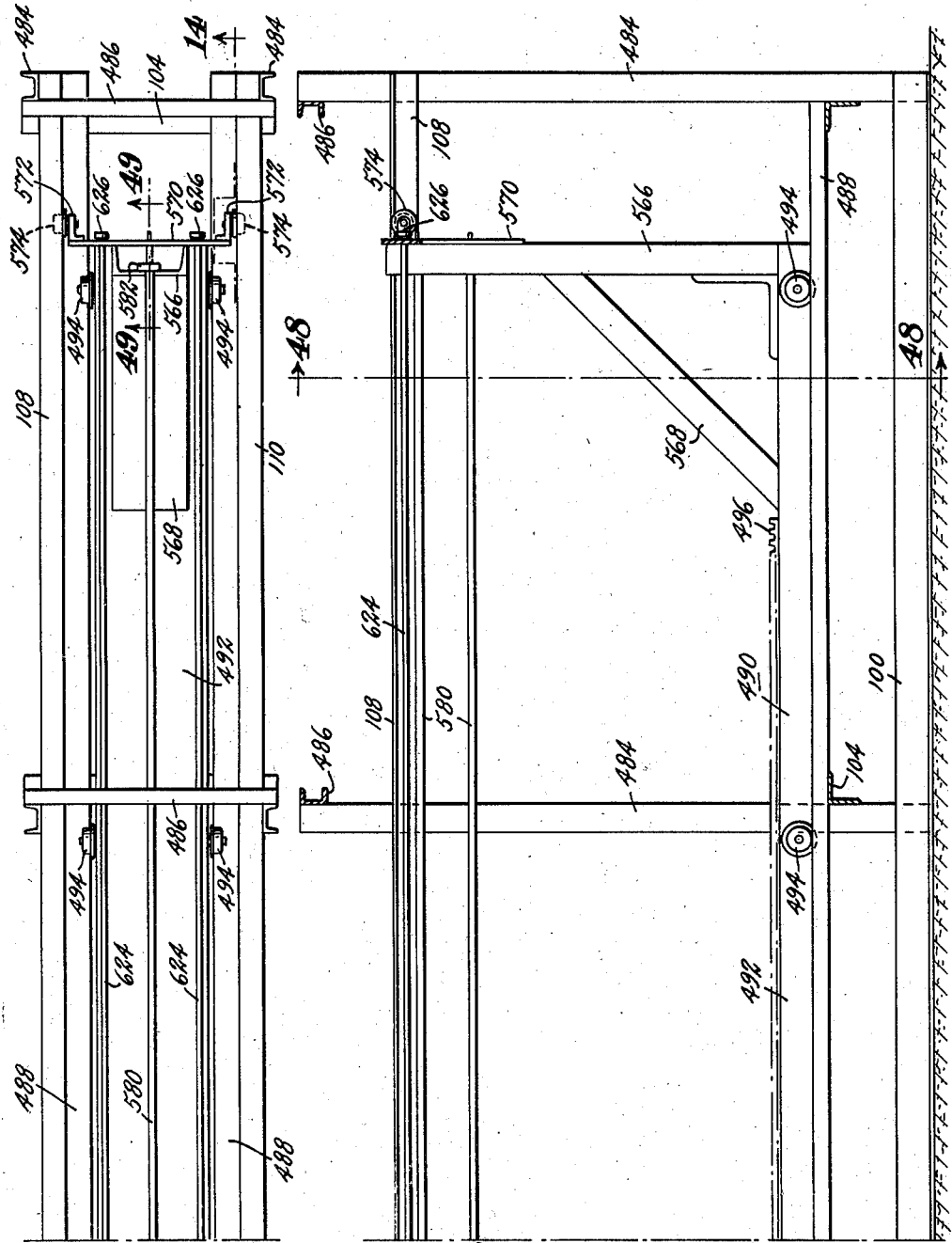

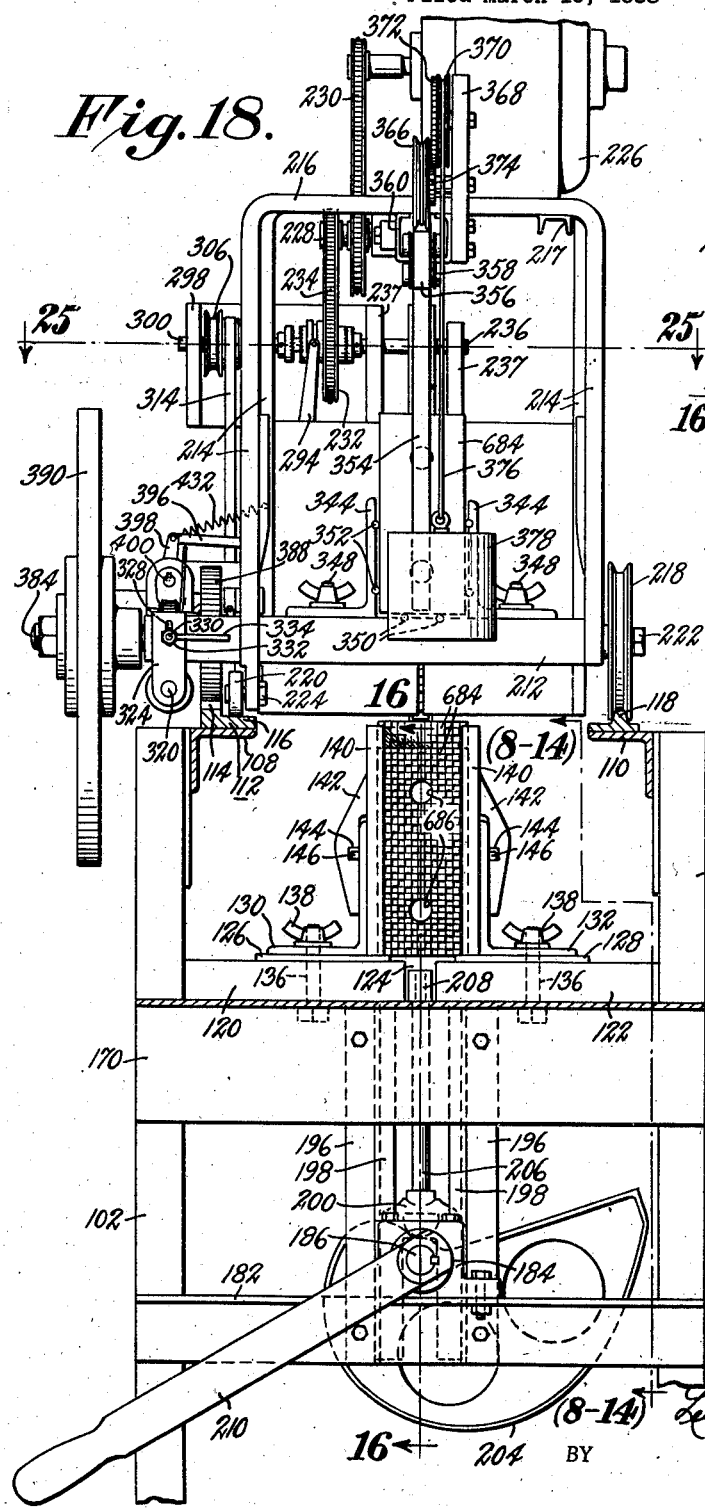

Oct. 14, 1941.  L. U. LARKIN  2,258,618
APPARATUS FOR THE MANUFACTURE OF FINNED STRUCTURES
Filed March 19, 1938  17 Sheets-Sheet 10
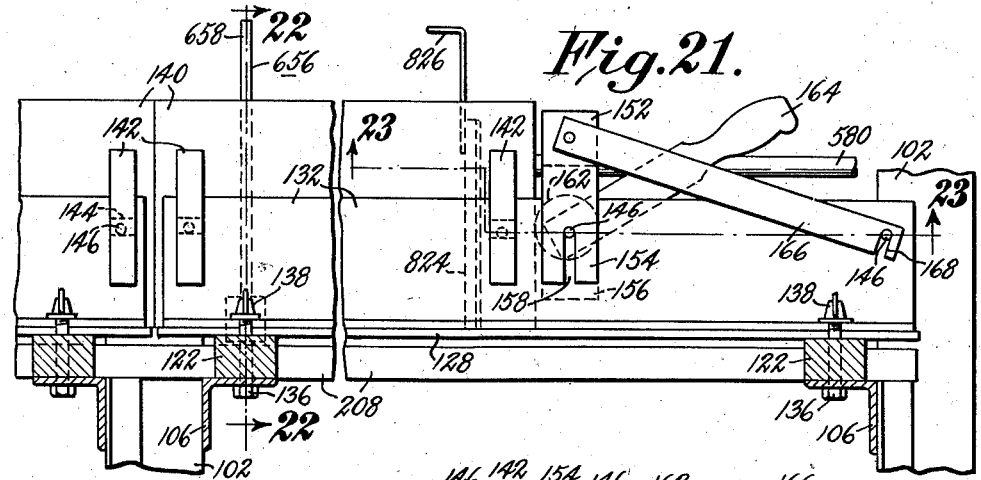
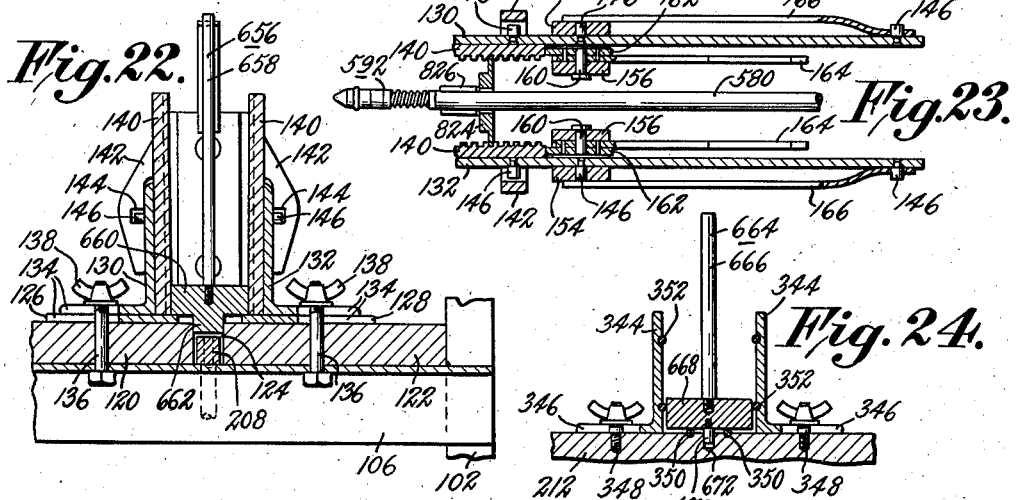
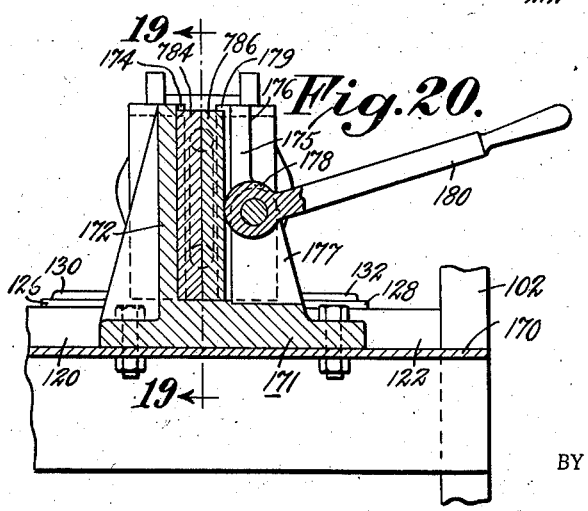
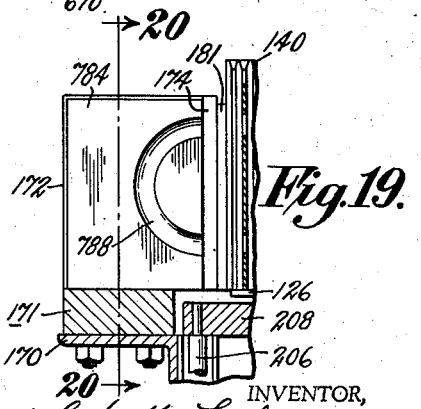
INVENTOR,
Lester U. Larkin,
BY
Wm. J. Hedlund
his ATTORNEY.

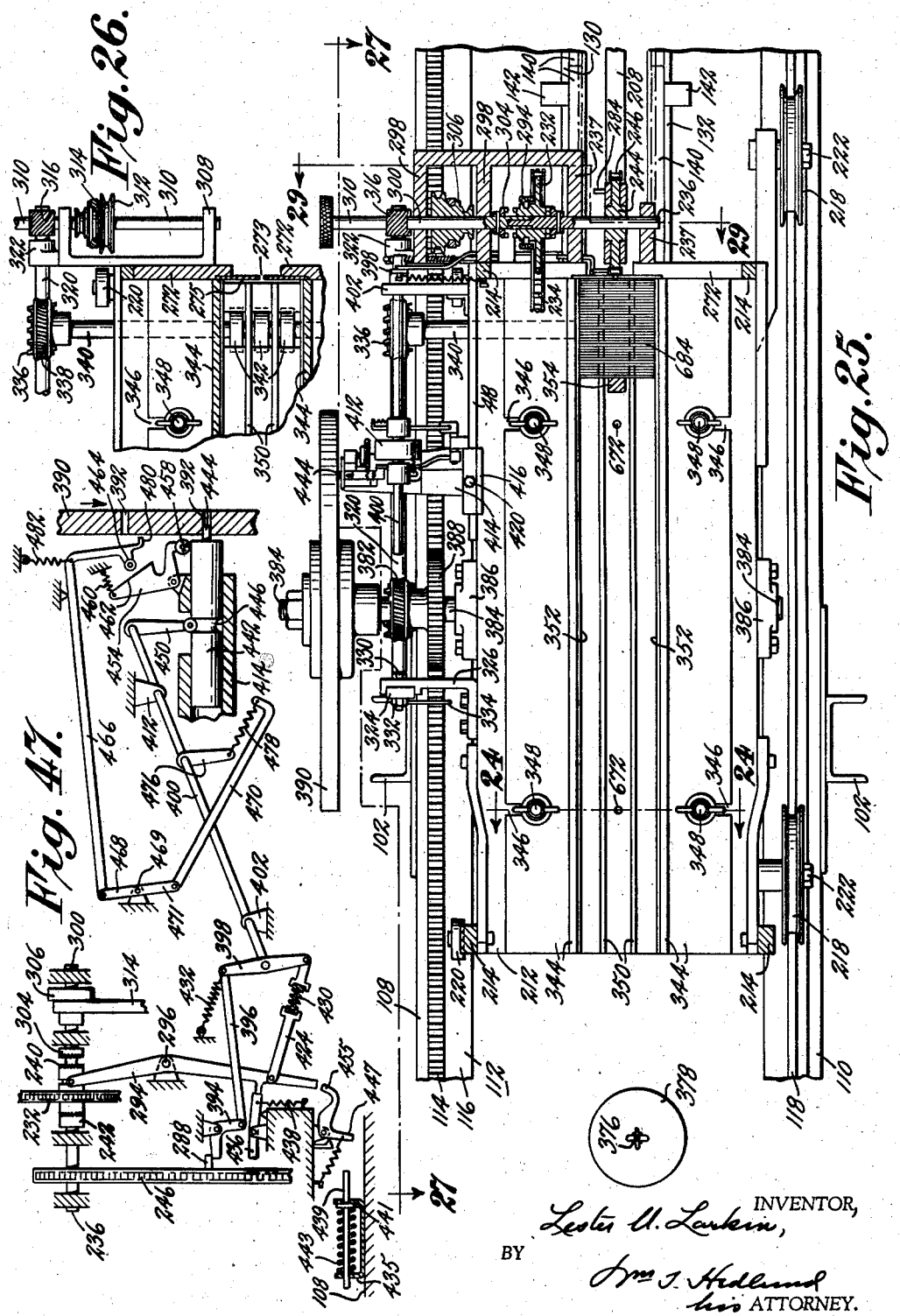

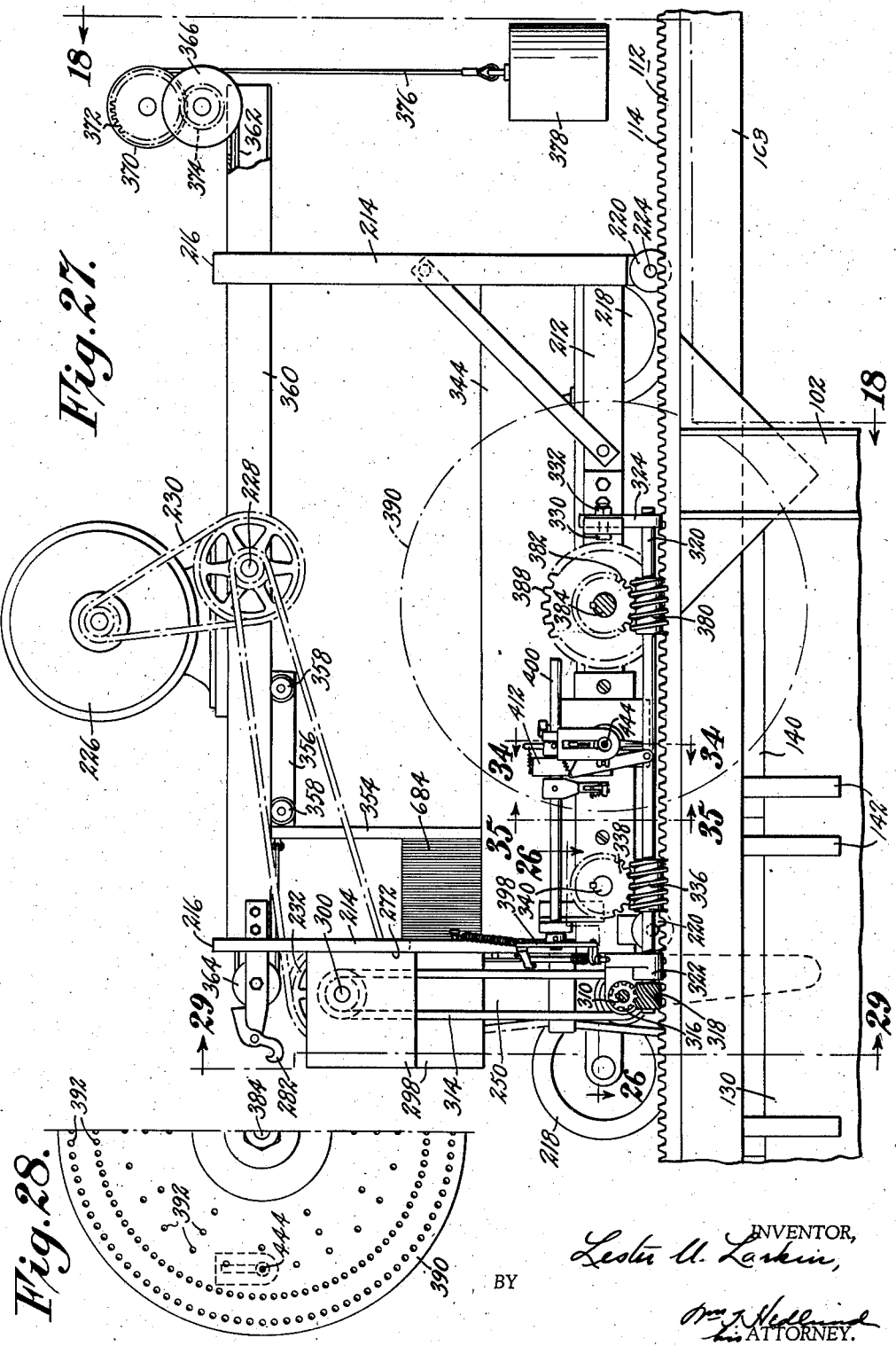

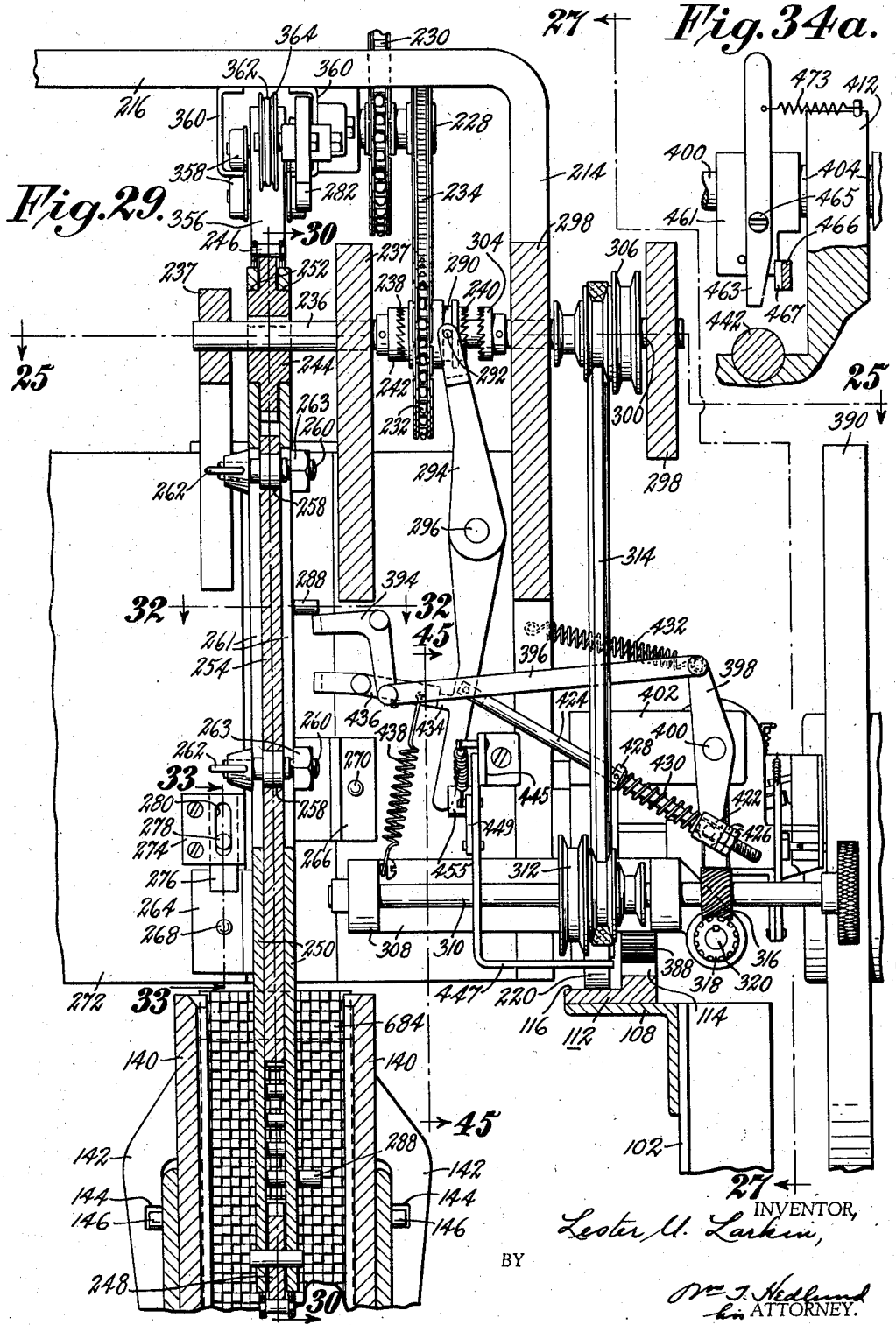

Oct. 14, 1941.   L. U. LARKIN   2,258,618
APPARATUS FOR THE MANUFACTURE OF FINNED STRUCTURES
Filed March 19, 1938   17 Sheets-Sheet 14
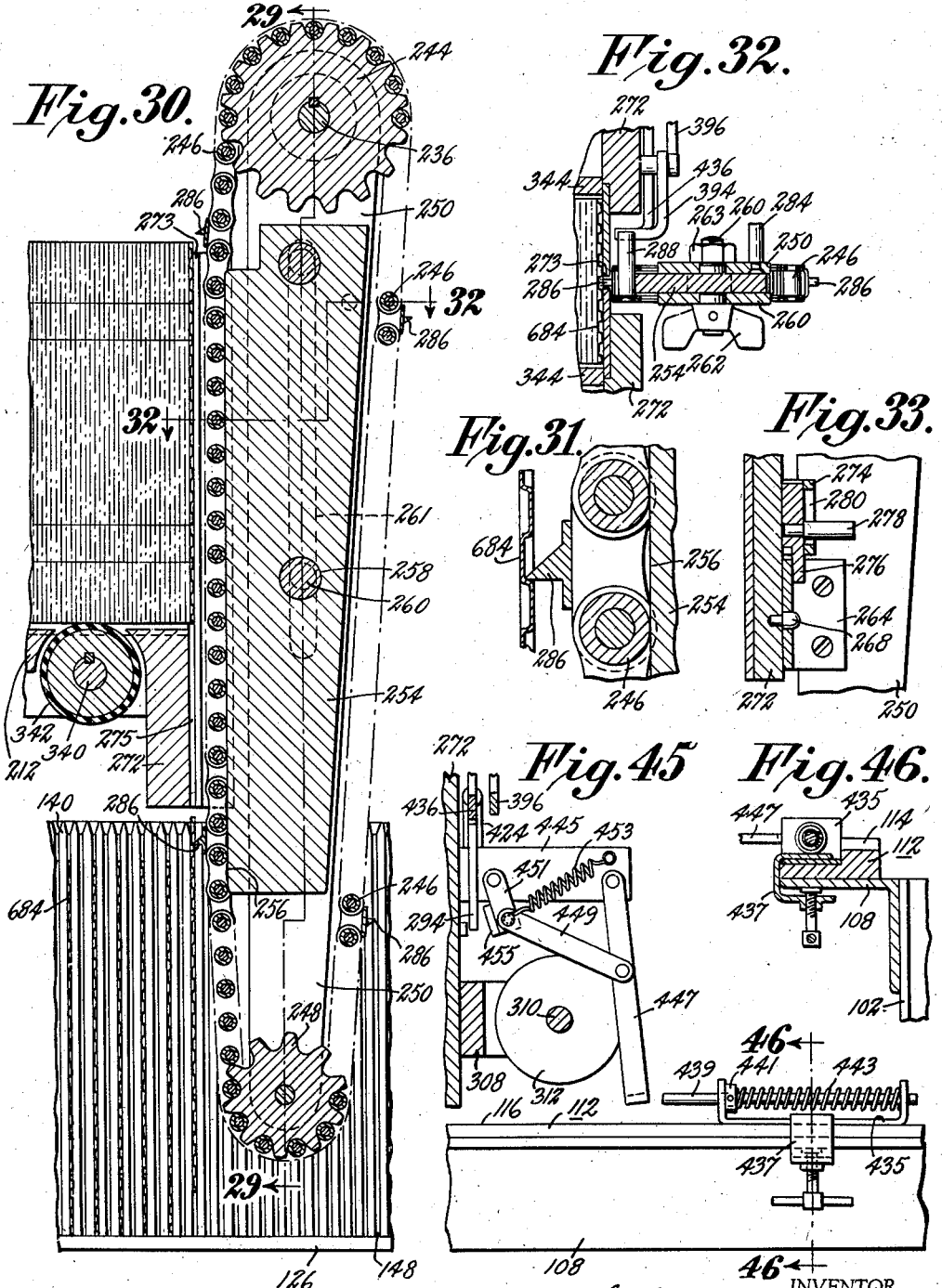

Oct. 14, 1941.　　　　L. U. LARKIN　　　　2,258,618
APPARATUS FOR THE MANUFACTURE OF FINNED STRUCTURES
Filed March 19, 1938　　　17 Sheets-Sheet 15
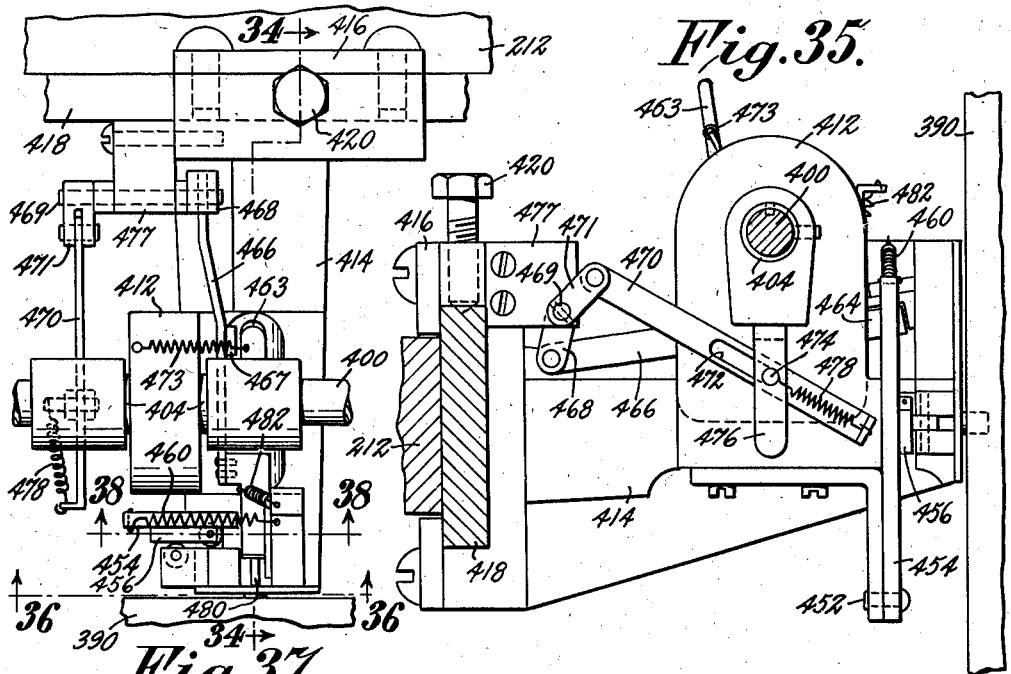
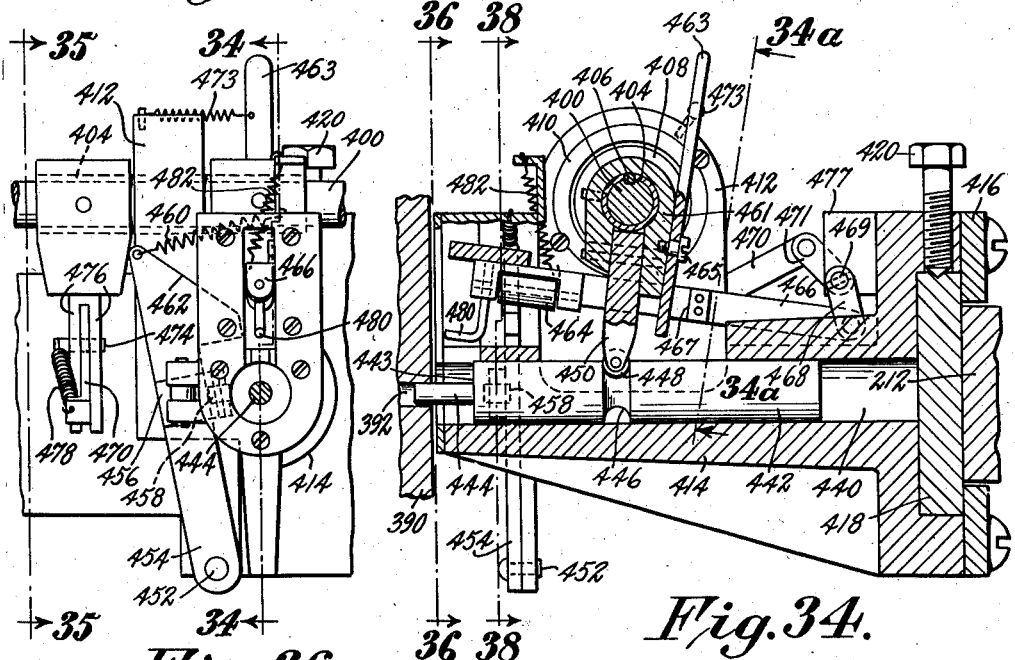
INVENTOR,
Lester U. Larkin,
BY
his ATTORNEY.

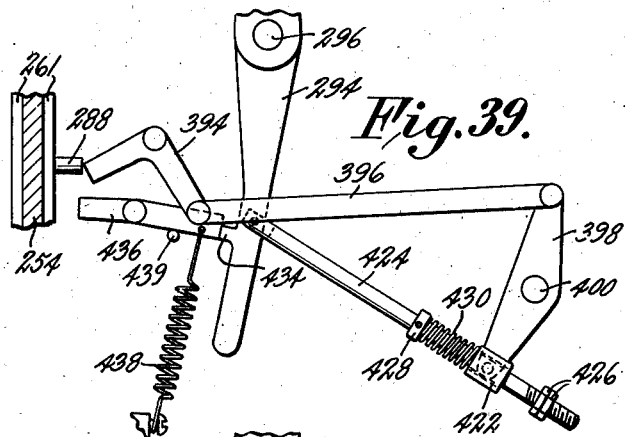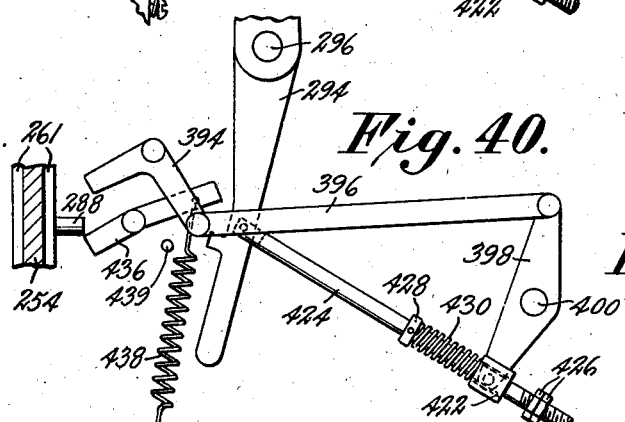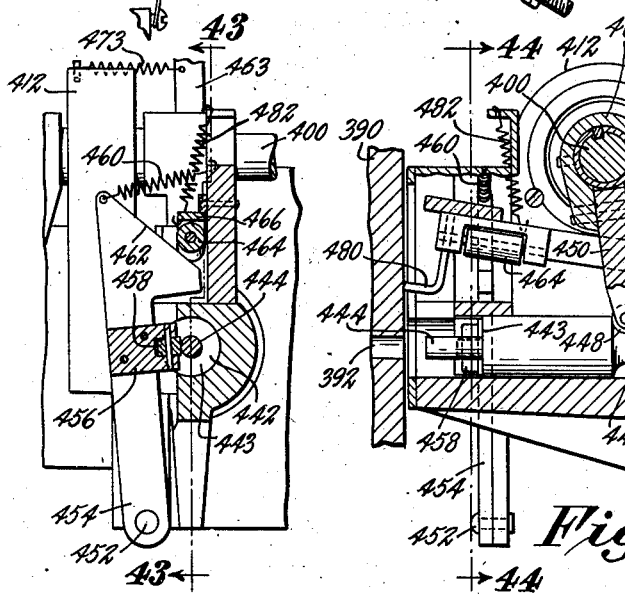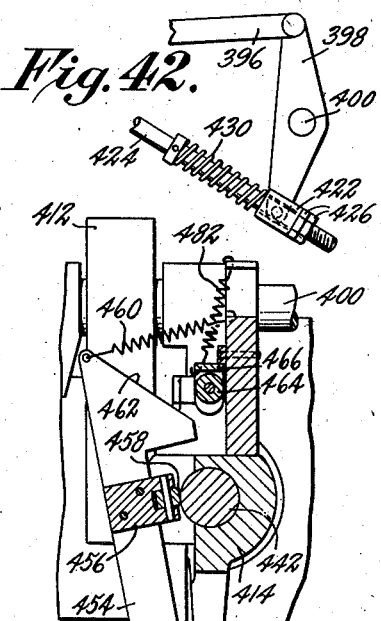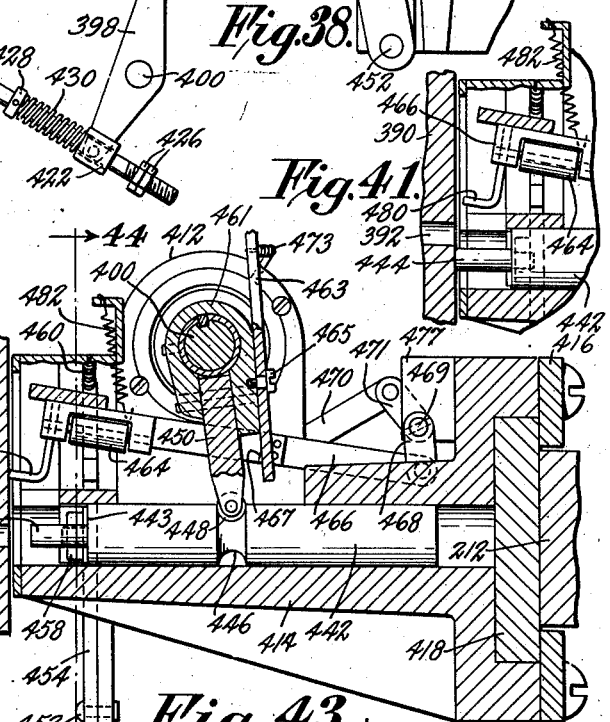

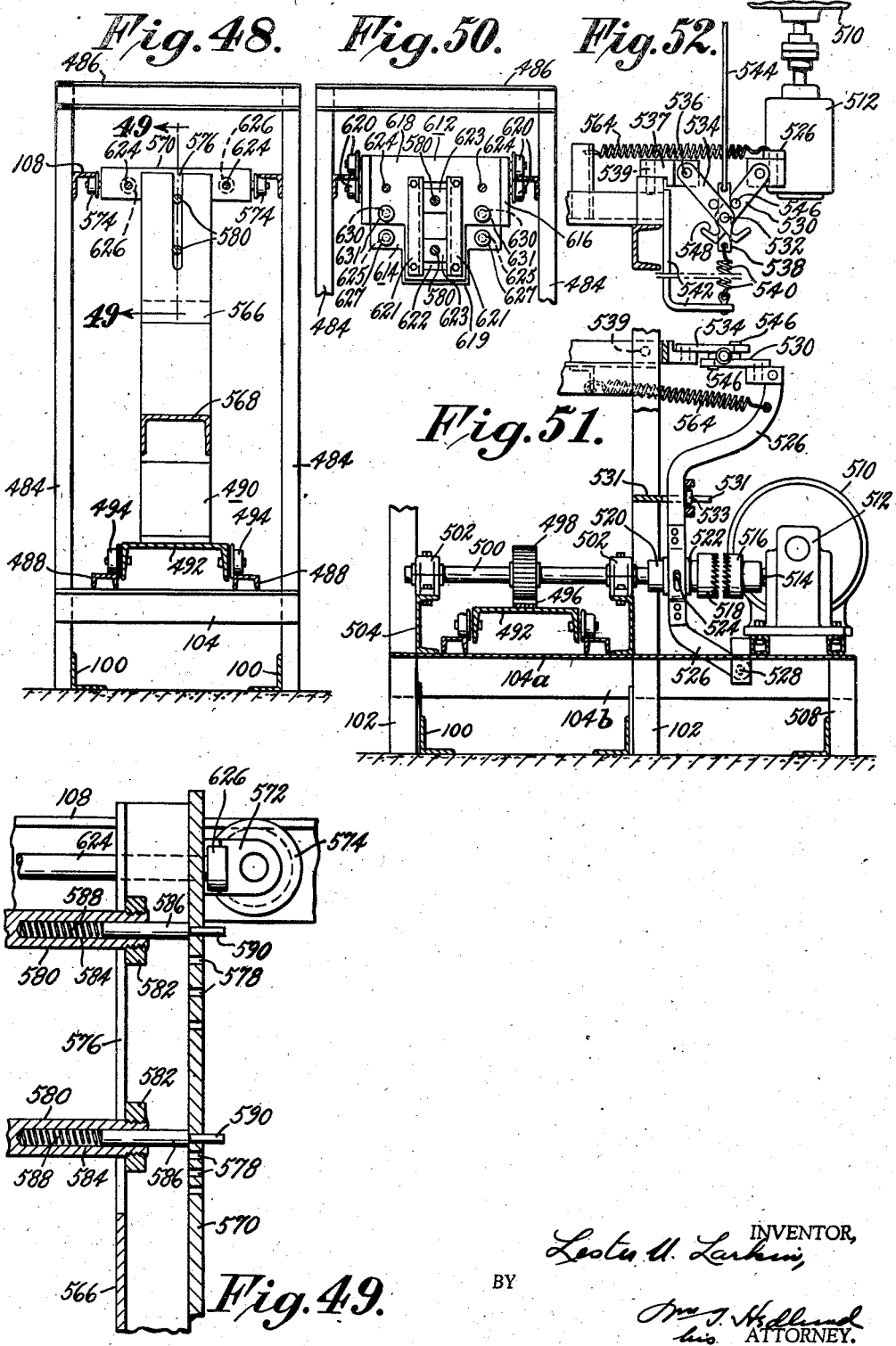

Patented Oct. 14, 1941

2,258,618

UNITED STATES PATENT OFFICE 2,258,618

APPARATUS FOR THE MANUFACTURE OF FINNED STRUCTURES

Lester U. Larkin, Baltimore, Md., assignor to Lul Products, Inc., Baltimore, Md., a corporation of Maryland Application March 19, 1938, Serial No. 196,881

20 Claims. (Cl. 214—8)

My invention relates to the art of automatic machines. More specifically, my invention relates to an improved apparatus for the manufacture of an improved finned heat exchange coil, particularly adapted for use as an evaporator in a mechanical refrigerating system.

Among the objects of my invention is to provide automatic machinery for manufacturing finned coils and like structures, which is relatively easy to operate and does not require skilled labor, may be operated by a single operator with minimum attention, may be readily assembled or disassembled for shipment, may be installed in a small space, has relatively small floor load, does not require special or expensive foundations, requires but a small amount of power for operation, and is capable of rapidly manufacturing finned coils of any desired dimensions of coil length, fin size and fin spacing in a room having normal ceiling height.

Commercial refrigerators are constructed in a multitude of sizes and shapes and are used for many different purposes requiring different temperature levels, and as a result it has become the established practice in the industry for the cabinets and the evaporator coils to be made by different manufacturers. Consequently after the various factors affecting the size of the evaporator have been determined for each individual installation, the proper coil is ordered from a coil manufacturer, who maintains a factory for making coils. This not only entails delays incident to shipping, but involves additional expense, as a completed coil is bulky and must be carefully crated in order to avoid damage.

However, due to its low cost and simplicity of operation, an automatic machine in accordance with my invention may be supplied to a dealer or jobber, whereby he may construct coils of various shapes and sizes as they are required for each installation. In this way, not only is there considerable saving in time, but freight costs are materially reduced as the parts necessary for the construction of a coil may be shipped much cheaper than a completed coil.

Further objects of my invention are to provide, in a machine of the type above referred to, improved automatic means for depositing fins of various sizes in variable spaced relationship, and for retaining the deposited fins, improved means whereby a tube may be placed in position extending through apertures in said fins and the tube thereafter expanded to secure the fins in place thereon.

Another object of my invention is to provide a carriage for depositing fins, including a motor for both driving the carriage and for driving a fin depositing member, with automatic means for shifting the connection between the motor and the carriage drive and between the motor and the fin depositing member so that the carriage remains stationary until a fin has been deposited, whereupon it is moved a predetermined, but variable distance, and then deposits another fin. My invention also includes means for automatically stopping both the travel of the carriage and the operation of the fin depositing member after a predetermined number of fins have been deposited.

Further objects and advantages of my invention will be apparent from the following description considered in connection with the accompanying drawings which form a part of this specification. In the description, the various elements have in general been given more or less specific terms in order that the description may be more readily understood, but it is not intended that any specific terminology shall limit the scope of the disclosure and the specific terms are intended to include all equivalent elements.

As will appear more in detail hereinafter the machine in accordance with my invention may be said to include four principal parts, namely, a main frame, a run-out frame, a fin depositing carriage and tube expander mechanism. The frames are preferably made of structural steel, the run-out frame being a continuation of the main frame. The fin depositing carriage is arranged to travel on the main frame, while the expander mechanism moves along both frames. Although the particular run-out frame and expander mechanism illustrated forms no part of the invention as herein claimed, and could be replaced by other apparatus performing similar functions, it is described herein in order to provide a more complete understanding of my invention.

Suitably supported along the main frame are spaced substantially parallel comb members forming a comb trough. The fin depositing carriage is mounted to travel on a track carried by the main frame, the track being so arranged that the carriage travels over the comb trough. A rack is also secured to the main frame and is engaged by a pinion on the carriage, there being an electric motor on the carriage for driving the pinion, which consequently causes the carriage to travel on the track. The carriage also includes a fin magazine and means operated by the electric motor for transferring one fin at a time from the magazine to the comb trough. Automatic mechanism is provided for alternately connecting the motor with the fin transferring mechanism and with the pinion for driving the carriage, whereby a fin is transferred to the comb trough, the carriage is caused to travel a predetermined distance, another fin is deposited in the comb trough, and so on. This results in a series of fins being deposited in spaced relationship in the comb trough. Means are provided for varying the distance through which the carriage travels between each fin transferring operation, which, of course, varies the spacing at which the fins are deposited in the comb trough. The carriage carries automatic mechanism for terminating its operation after a predetermined number of fins have been transferred to the trough. This mechanism cooperates with structure which may be secured in the path of travel of the carriage at any point along the comb trough, the point at which this structure is secured determining the number of fins which will be deposited.

The fins are formed with one or more apertures through which tubing is inserted after the fins have been transferred to the comb trough and while the fins are still retained in parallel position therein. Clamping means is provided on the main frame for retaining such tubing against lengthwise displacement with respect to the fins. With the tubing thus held in place, it may be expanded so as to fit tightly within the apertures, thus fixing the fins on the tubing.

The main frame also supports a lifting bar for removing the fins and tubes after the latter have been expanded so as to form with the fins an integral unit.

The above, and other related apparatus, is described hereinafter in detail, and is illustrated in the accompanying drawings, of which:

Figs. 1 through 7 constitute a top view of the frame of the main machine for manufacturing finned coils;

Figs. 8 through 14 are cross-sectional views taken on the corresponding section lines of Figs. 1 through 7, respectively, and each figure is taken on the line (8—14) (—8—14) of Fig. 18;

Fig. 15 is a cross-sectional view taken on the lines 15—15 of Fig. 8 and Fig. 16;

Fig. 16 is a cross-sectional view taken on the line 16—16 of Fig. 15;

Fig. 17 is a side view of the fin depositing carriage mounted on the frame;

Fig. 18 is a rear end view of the carriage, the frame being shown in section along the line 18—18 of Fig. 17;

Fig. 19 is a cross-sectional view taken on the lines 19—19 of Figs. 1 and 20, but includes certain structure not shown in Fig. 1;

Fig. 20 is a cross-sectional view taken on the lines 20—20 of Figs. 8 and 19, but includes certain structure not shown in Fig. 8;

Fig. 21 is a cross-sectional view taken on the line 21—21 of Fig. 4;

Fig. 22 is a cross-sectional view taken on the line 22—22 of Fig. 21

Fig. 23 is a cross-sectional view taken on the lines 23—23 of Figs. 11 and 21;

Fig. 24 is a cross-sectional view taken on the line 24—24 of Fig. 25, but includes a member now shown in Fig. 25;

Fig. 25 is a cross-sectional view of the carriage taken on the lines 25—25 of Figs. 17, 18, and 29;

Fig. 26 is a cross-sectional view of a portion of the carriage taken on the line 26—26 of Fig. 27;

Fig. 27 is a side view of the carriage looking from the opposite side than that of Fig. 17, and is taken on the lines 27—27 of Figs. 25 and 29;

Fig. 28 is a side view of a portion of an index wheel forming part of the carriage;

Fig. 29 is a cross-sectional view, on enlarged scale, taken on the lines 29—29 of Figs. 17, 25, 27 and 30;

Fig. 30 is a cross-sectional view taken on the line 30—30 in Fig. 29;

Fig. 31 is an enlarged view of a detail shown in Fig. 30;

Fig. 32 is a cross-sectional view taken on the lines 32—32 of Figs. 29 and 30;

Fig. 33 is a cross-sectional view taken on the line 33—33 of Fig. 29;

Fig. 34 is an enlarged cross-sectional view taken on the lines 34—34 of Figs. 27, 36 and 37;

Fig. 34a is a fragmentary view taken on line 34a—34a of Fig. 34.

Fig. 35 is a cross-sectional view, looking in the opposite direction from Fig. 34, and is taken on the lines 35—35 of Figs. 27 and 36;

Fig. 36 is a cross-sectional view taken on the lines 36—36 of Figs. 34 and 37;

Fig. 37 is a top view of the device shown in Fig. 36;

Fig. 38 is a cross-sectional view taken on the lines 38—38 of Figs. 34 and 37;

Fig. 39 is an elevational view showing certain of the parts illustrated in Fig. 29, but in different relative positions;

Fig. 40 is similar to Fig. 39, but shows the parts in still different positions;

Fig. 41 is a view of a portion of the parts illustrated in Fig. 34, but with the parts in different relative positions, and corresponding to the position of the parts illustrated in Fig. 42;

Fig. 42 shows a portion of the apparatus illustrated in Figs. 29, 39 and 40, but with the parts in different relative positions;

Fig. 43 is a cross-sectional view of the parts illustrated in Fig. 34, but with the parts in different positions, corresponding to the position of the parts shown in Fig. 39 or 40, and is taken on the line 43—43 of Fig. 44;

Fig. 44 is a cross-sectional view taken on the line 44—44 of Fig. 43;

Fig. 45 is a cross-sectional view taken on the line 45—45 of Fig. 29;

Fig. 46 is a cross-sectional view taken on the line 46—46 of Fig. 45;

Fig. 47 is a diagrammatic view showing the relationship between the parts illustrated in Figs. 34 through 46;

Fig. 48 is a cross-sectional view taken on the line 48—48 of Fig. 14;

Fig. 49 is a cross-sectional view taken on the lines 49—49 of Figs. 7 and 48;

Fig. 50 is a cross-sectional view taken on the line 50—50 of Fig. 13;

Fig. 51 is a cross-sectional view taken on the line 51—51 of Fig. 11; and

Fig. 52 is a top view of the device shown in Fig. 51.

The main frame

The main frame, which is illustrated in top view in Figs. 1, 2, 3, and a portion of Fig. 4, and in cross-section in Figs. 8, 9, 10, and a portion of Fig. 11, is of a length equal to the longest coil which it is desired to manufacture by the machine, plus the length of the fin depositing carriage, and of a clamping device. Figs. 1 through 7 and 8 through 14 are respectively continuations of each other. That is, by abutting Figs. 1 through 7 a complete top view of the entire frame is obtained. The main frame is preferably made of structural steel and includes a pair of parallel angles 100 which are suitably secured to a floor or other foundation. Secured to angles 100 at suitable intervals are vertically extending channels 102. Corresponding channels 102 on opposite sides of the frame are connected by cross-angles 104 a short distance above the floor, and similar cross-angles 106 near their upper ends. Extending longitudinally of the frame and secured to the inner sides of channels 102 are angles 108 and 110. Mounted on the horizontal leg of angle 108 is a member 112 having a rack 114 extending along one side of its upper surface and a track 116 extending parallel to the rack. Angle 110 carries a track 118.

Secured to the horizontal flanges of angles 106 in any suitable manner, as by welding, are pairs of blocks 120 and 122 (see particularly Figs. 18 and 22), the inner ends of which are spaced apart to leave a space 124. Supported on blocks 120 and 122 are longitudinally extending plates 126 and 128. These plates have secured thereto, as by welding, longitudinally extending angles 130 and 132. The plates are adjustable in a transverse direction so as to permit variation in the space between the angles. For this purpose the plates and the horizontal flanges of the angles are provided with transverse slots 134 through which extend bolts 136 which are anchored in the angles 106 and the blocks 120 or 122. Bolts 136 are provided with wing nuts 138 which may be tightened against the horizontal flanges of angles 130 and 132 to retain these angles in desired positions. The plates and angles carried thereby are of equal length, which is approximately the distance between adjacent channels 102. The upwardly extending flanges of angles 130 and 132 are slightly inclined outwardly from the vertical and serve to support comb sections 140. Each section is comparatively short and is provided on its outer side adjacent to each end with a bracket 142 which is adapted to embrace the outer surface of the vertical flanges on angles 130 or 132. Each of these brackets is formed with a recess 144 adapted to receive pins 146 which protrude outwardly from the vertical flanges of angles 130 and 132. The inner faces of combs 140 are formed with equally spaced grooves 148. Due to the inclination of the flanges of angles 130 and 132, opposite comb sections are further apart at the top than at the bottom. The spacing of these grooves is the same as the closest spacing desired of the fins on the coil which is to be manufactured by the machine. If desired, a plurality of sets of comb sections having different groove spacings may be provided.

An angle 170 is secured transversely between the second pair of channels 102, counting from the left toward the right in Figs. 1 and 8. Bolted to the horizontal flange of angle 170 is a member 171 (Figs. 19, 20) including a fixed clamping plate or wall 172, which is formed with an inturned lip or abutment 174. Member 171 also includes a slotted plate or wall 176 from the side of which extend arms 177 between which is journalled a cam 178 which projects through the slot 175 (Figs. 1, 20) in plate 176. The cam is formed with a handle 180 for rotating it. Plate 176 is formed with an abutment 179. Bearing plates 181 are secured to the ends of plates 172 and 176. The purpose of this clamping device will be explained later in the description of the operation of the machine.

The comb sections 140 are clamped in place by means of clamping devices shown in Figs. 4, 11, 21, and 23. There is one clamping device for the comb sections supported by angles 130 and a similar clamping device for the comb section supported by angles 132. Each clamping device includes a forked member 152 having parallel spaced legs 154 and 156, which are adapted to straddle the vertical flanges of angles 130 and 132. The outer leg 154 is provided with a vertically extending slot 158 which slides over one of the pins 146 carried by the flanges. The inner leg 156 carries a pin 160 on which is rotatably mounted a cam 162, which may be rotated by means of a handle 164. Secured to the upper end of member 152 is an arm 166, the opposite end of which is formed with a slot 168 adapted to engage another of the pins 146. When the clamping device is in the position shown particularly in Fig. 21, the cam 162 contacts the end of the last comb section 140 and, if the handle 164 is raised, the cam tends to displace the comb section to the left. The ends of the several comb sections are in contact with each other, and the end of the last comb section at the other end of the frame is in contact with the bearing plates 181. Consequently, when the cam 162 is rotated in the above manner, it serves to clamp all of the comb sections together. The brackets 142 on the comb sections hold them in a vertical position and the pins 146, which engage within the recess 144 in the brackets 142, prevent the comb sections from being raised. If it is desired to remove the sections, the cam 162 is rotated so as to loosen them, whereupon the clamping device may be removed by lifting it off the pins 146. Thereupon, the individual comb sections, starting at the right as viewed in the figures, may be slid a sufficient distance to the right so that the pins 146 are no longer disposed within the recess 144 in the brackets 142, whereupon each comb section may be lifted off. If it is not desired to make use of the entire length of the machine, only a portion of the total number of comb sections need be used, and the clamping device for the comb sections may be placed anywhere along the flanges 130 and 132, that is, with the slots 158 and 168 of the clamping device in engagement with any adjacent pair of pins 146.

Secured to opposite channels 102 at an elevation between cross angles 104 and 106 are additional cross angles 182 to which are bolted bearings 184 for a longitudinally extending shaft 186. Shaft 186 is made in two sections which may be joined together by means of a coupling 188 shown in Fig. 10. The coupling comprises a sleeve which is permanently secured to one section of the shaft by means of a fixed pin 190 and may be secured to the other section by means of a removable pin 192. A chain 194 is preferably provided for preventing loss of the pin 192 when it is removed from the coupling so as to disconnect the two portions of the shaft.

Extending vertically from the cross angles 182 are pairs of spaced angles 196. The upper ends of the pair of angles 196 adjacent to the left hand end of the frame, as viewed in the figures, are secured to cross angle 170, as is shown in Figs. 1, 8, 15, 16 and 18. The upper ends of the remaining pairs of vertical angles 196 are secured to cross angles 106 as is shown, for instance, in Fig. 10. Vertical angles 196 carry vertically extending guide channels 198 between which is slidably disposed a block 200 having a cam contacting projection 202 extending from one side of it (to the right as shown in Fig. 16) and beyond the guide channels 198. Secured to shaft 186 is a cam 204 which is contacted by projection 202 so that, when the cam is rotated in a clockwise direction, as shown in Fig. 18, the block 200 will be raised. Secured to block 200 is a rod 206 which extends upwardly therefrom and is secured to a longitudinally extending bar 208, which normally extends through the spaces 124 between the pairs of blocks 120 and 122. It will be noted that there is a cam 204 secured to shaft 186 adjacent to each of the vertical channels 102 of the main frame, and that the bar 208 extends the entire length of the main frame. However, the bar 208 is made in two sections (see Fig. 10), as is the shaft 186. Consequently if the second section of the shaft is uncoupled from the first, only the first section of the bar 208 will be raised upon rotation of the shaft. A handle 210 keyed to the left hand end to the first section of shaft 186 is provided for rotating the shaft.

*The fin depositing carriage*

The fin depositing carriage is shown in Figs. 17, 18, and 25 through 47. It consists of a chassis including a base plate or platform 212 to which is secured inverted U-shaped frame members 214 having horizontal top members 216 connected by a channel 217 and channels 360. The carriage is provided with flanged wheels 218 which are adapted to run on track 118, and with rollers 220 which are adapted to run on track 116. Both wheels 218 and rollers 220 are mounted so as to be freely rotatable upon the supporting stub shafts 222 and 224, respectively.

Suitably mounted on the top of the channels 217 and 360 is an electric motor 226 which drives an idler shaft 228 by means of a chain and sprocket gearing 230. The motor may be connected to a suitable electric source by a free cord and is switch controlled. Idler shaft 228 in turn drives a sprocket wheel 232 through a chain 234. Wheel 232 is rotatably mounted on a shaft 236 (Fig. 29) which is rotatably supported in arms 237 (Figs. 18, 25, 29). Integral with the hub of wheel 232 is a double dog clutch having teeth 238 on one side of the wheel and similar teeth 240 on the other side (Fig. 29). Fixed to shaft 236 is a clutch member 242 having teeth adapted to mesh with teeth 238. Also fixed to shaft 236 is a sprocket wheel 244 which drives a fin depositing chain 246 (Fig. 30), which chain also runs over an idler sprocket 248 rotatably mounted between and near the lower ends of arms 250 which arms are fixed in spaced relationship to each other. The upper ends of arms 250 are pivotally mounted on bosses 252 (Fig. 29) formed by the hub of sprocket wheel 244. Arms 250 are thus pivotally mounted concentric with shaft 236. Disposed between arms 250 is a cam plate 254 formed with a guiding surface 256 (Fig. 30) over which the chain 246 runs. Plate 254 is formed with cylindrical holes 258 through which extend bolts 260 supported in slots 261 formed in the arms 250. The length of slot 261 is greater than the distance between bolts 260, whereby the plate and bolts may be slid longitudinally with respect to the arms 250. The cylindrical surface of the bolts 260 which contact the sides of holes 258 are eccentric with respect to the centers of the bolts so that rotation of the bolts displaces the cam plate 254 so that the guiding surface 256 of the plate displaces the left hand run of the chain 246, as viewed in Fig. 30, a greater or lesser distance from the center line connecting the centers of wheels 244 and 248. Wing members 262 (Figs. 29, 32) are pinned to the bolts for turning the latter to adjust the cam plate, and lock nuts 263 are provided for tightening the bolts.

Arms 250 are provided with a bracket 264 (Figs. 29, 33) on one side and a similar bracket 266 on the other side. These brackets are provided with holes which engage locating pins 268 and 270 respectively, which are secured to a front plate 272 of the carriage, and thus serve to prevent sidewise movement of the arms. A bracket 274 (Figs. 29, 33) is secured to the front plate 272 and slidably carries a member 276 on which is mounted a pin 278 projecting through an elongated slot 280 in the bracket 274. Member 276 is spaced from the front plate 272 a distance equal to the thickness of bracket 264 carried by the arms 250. When the arms 250 are moved to a substantially vertical position, as shown in Figs. 29 and 30 (working position), the operator raises the member 276 by means of pin 278 until the bracket 264 is in contact with the front plate 272 of the carriage, whereupon the member 276 is slid downwardly to engage the front face of bracket 264, thus locking the arms 250 in this position. The length of arms 250 is such that, when in the aforesaid vertical position, they extend to near the bottom of the trough formed by the comb sections 140, as appears from Fig. 30. When it is desired to remove the arms from the comb trough, they may be pivoted about shaft 236 to an upwardly inclined non-working position, as shown in dotted lines in Fig. 17, in which position they may be retained by means of a pivoted counterbalanced hook 282, shown in Fig. 17, which engages a pin 284 on the arms.

Equally spaced along the length of fin depositing chain 246 are fin engaging fingers 286 (Figs. 30, 31). A plurality of pins 288 project from one side of the chain 246 (Fig. 29), the number of these pins being the same as the number of fingers 286.

Sprocket wheel 232, which carries the clutch teeth 238 and 240, is axially displaceable on the shaft 236. Integral with the wheel is a clutch throw collar 290 having a peripheral groove which is engaged by pins 292 mounted on the forked end of a bell crank lever 294 which is pivotally mounted at 296 on the plate 272. Rotatably mounted in arms 298 so as to extend coaxial with shaft 236, but rotatable relative thereto, is a shaft 300 (Fig. 25). Shaft 300 carries a dog clutch member 304 having teeth which are adapted to mesh with teeth 240. Shaft 300 also carries a step pulley 306 having any desired number of pulley steps. A bracket 308 is secured to the lower part of front plate 272 and carries a shaft 310 (Figs. 26, 29). Mounted on shaft 310 in belt alignment with the step pulley 306, is a similar step pulley 312. A belt 314 transmits rotation from pulley 306 to pulley 312, the step pulleys permitting different ratios. Shaft 310 likewise carries a spiral gear 316 which meshes with a spiral gear 318 fixed to a shaft 320, one end of which shaft is rotatably carried in a bearing 322 (Figs. 26, 27) supported by the bracket 308. The other end of shaft 320 is rotatably supported in a bearing mounted in a vertically displaceable arm 324 supported on a bracket 326 mounted on the side of the carriage frame. Arm 324 is provided with a vertically extending slot 328 (Fig. 18) through which extends a bolt 330 (Fig. 25) having a nut 332 which may be tightened and loosened by an arm 334 (Fig. 18) secured thereto. Thus, this end of the shaft may be raised and lowered a slight amount, the flexibility of the shaft and the looseness of bearing 322 permitting this.

Shaft 320 carries a worm 336 (Fig. 27) driving a worm wheel 338 secured to a shaft 340 (Fig. 26). This latter shaft extends transversely of the carriage and carries a plurality of feed rollers 342 (Fig. 30) which project a slight distance upwardly through openings provided in that portion of the base plate 212 which forms the bottom of a fin magazine. The sides of the magazine comprise angles 344 (Fig. 25), the space between which angles is adjustable in order to accommodate different sizes of fins. The horizontal flanges of the angles are provided with slots 346 through which extend bolts 348 provided with wing nuts for securing the angles in desired positions. Imbedded in the base plate at the bottom of the magazine are a plurality of hardened, smooth-surfaced rods 350 and similar rods 352 are imbedded in the vertical flanges of the angles 344. The purpose of these rods is to support the fins contained in the magazine and to reduce the friction resulting when the fins are fed forward. The feed rollers 342 are preferably faced with a friction material, preferably impervious to oil, such as leather.

An additional feeding means for the fins in the magazine includes an arm 354 extending downwardly from a trolley 356 (Figs. 17 and 27) provided with flanged rollers 358 (Fig. 29) which engage on both sides of flanges formed on channels 360 supported from members 214. A cable 362 (see Fig. 17) is secured to the forward end of trolley 356 and passes around a rotatably mounted pulley 364 and then passes backwardly and is wound around a flanged drum 366 mounted on a pin carried by an arm 368. Another drum 370 is mounted on arm 368 and is integral with a gear 372 (Fig. 27) which meshes with a smaller gear 374 integral with drum 366. A cable 376 is wound around drum 370 and supports a weight 378. The weight 378 tends to unwind the cable 376 from the drum 370, thus tending to rotate the drum in a counter-clockwise direction, as viewed in Fig. 17. Such rotation of drum 370 rotates drum 366 in a clockwise direction, thus winding thereon the cable 362 and moving the trolley 356 and the arm 354 in a direction such as to feed the fins 684 in the magazine forwardly.

Shaft 320 also carries a worm 380 which meshes with a worm gear 382 secured to a shaft 384 (Fig. 27) rotatably mounted in a bearing 386 (Fig. 25) secured to the carriage frame. Integral with gear 382 is a pinion 388 which meshes with the rack 114 mounted on the main frame. Likewise secured to shaft 384 is an index wheel 390 provided with a plurality of circular rows of holes 392 (Figs. 17, 28). As shown particularly in Fig. 28, there are five rows of these holes. In any one row the holes are equally spaced. However, the space between the holes in one row is different from the space between the holes in any other row.

Pivotally mounted on the front plate 272 is a bell crank lever 394 (Fig. 29), the horizontal arm of which is arranged so as to normally be located in the path of travel of the pins 288 carried by the fin depositing chain 246. The other arm of the bell crank lever is pivotally secured to one end of an arm 396, the other end of which is pivotally secured to one end of a bell crank lever 398 fixedly mounted on a rock shaft 400, which shaft is rotatably mounted in a stationary arm 402 (Figs. 25, 29) secured to the side of the carriage frame. A sleeve 404 (Figs. 34-37) surrounds the shaft 400 adjacent to its opposite end and is keyed thereto for rotation therewith by means of a key 406. Sleeve 404 is axially displaceable with respect to the shaft 400. Sleeve 404 carries the inner ring 408 of a ball bearing, the outer ring 410 of which is mounted in a bearing support 412. Support 412 is carried by an arm 414 (Figs. 25, 35, 37) which is slidable in a longitudinal direction along a horizontal rail 418 fastened to the side of base plate 212 and retained thereon by flange plates 416. A set screw 420 serves to secure the bracket 416 in any desired location.

The lower end of bell crank 398 has pivotally secured thereto a collar 422 (Fig. 29) which is slidable on a rod 424 (see Figs. 39, 40 and 42), the other end of which rod is pivotally connected to the lower end of a bell crank 294. The top end of bell crank 294 engages the clutch throw collar 290. Nuts 426 threaded on rod 424 limit the movement of collar 422 in one direction. A collar 428 is fixed to rod 424 and a compression spring 430 is disposed between this collar and the slidable collar 422. A tension spring 432 (Fig. 29) is secured to the upper end of bell crank 398 and to the frame of the carriage, and tends to hold the bell crank and associated parts in the position shown in Fig. 29.

The lower end of bell crank 294 is provided with a projection 434 which is adapted to be engaged by one end of a lever 436 which is pivoted to the front plate 272. The other end of lever 436 is disposed below the horizontal arm of bell crank 394, and in the path of travel of the pins 288 carried by the fin depositing chain. A tension spring 438 tends to hold lever 436 in the position shown in Fig. 29 against a fixed stop 439 (Fig. 39).

Slidably mounted in a bore 440 (Fig. 34) formed in arm 414 is a locating pin 442 having an end portion 444 of reduced diameter, the diameter of this portion being such that it fits easily into the holes 392 formed in index wheel 390. Pin 442 is formed with a peripheral groove 446 which is engaged by a roller 448 mounted on the lower end of an arm 450 (Figs. 34, 43), the other end of which arm is secured by means of a clamp 461 to the sleeve 404 carried by the rock shaft 400. Pivotally mounted at 452 (Figs. 36, 44) on the outer end of arm 414 is a lever 454, which lever carries a bracket 456 at the end of which is mounted a roller 458. A tension spring 460 tends to rotate lever 454 so that roller 458 is held against the side of pin 442 (Fig. 38). When the pin is retracted to the position shown in Figs. 43 and 44, the roller engages the shoulder formed between the main portion of the pin and the portion 444 of reduced diameter, thus serving to hold the pin in its retracted position. Inasmuch as the pin 442 is connected to the rock shaft 400 by means of the arm 450, the shaft is held in a corresponding position. The upper end of lever 454 is formed with a cam surface 462 which is adapted to be contacted by a roller 464 carried by an arm 466. The opposite end of arm 466 is pivotally connected to a lever 468 fixed to a rotatable shaft 469 mounted in a member 477 secured to arm 414. The opposite end of shaft 469 (Figs. 35, 37) carries a lever 471 to which is pivotally connected an arm 470, shown particularly in Figs. 35 and 37. Arm 470 is formed with an elongated slot 472 which is engaged by a pin 474 carried by a lever 476, which lever is secured to the sleeve 404 mounted on the rock shaft 400. A tension spring 478 is connected between the end of lever 470 and pin 474.

Mounted on the end of lever 466, beyond roller 464, is a hook shaped trip pin 480 (Fig. 34). Pin 480 is disposed directly above the reduced portion 444 of locating pin 442 and is adapted to engage in a hole 392 of the index wheel 390. A tension spring 482 is connected to lever 446 and tends to hold this lever in raised position.

A lever 463 is pivotally mounted on screw 465 on the side of clamp 461 and, in one position the lower end of the lever is arranged to engage an abutment 467 secured to the side of arm 466. Normally, while the machine is in operation, lever 463 is held out of engagement with the abutment 467 by tension spring 473. Lever 463 may be manually moved to engage abutment 467 to lock arm 466 in retracted position.

In order to automatically stop the operation and travel of the fin depositing carriage after the desired number of fins has been deposited, a U-shaped member 435 is provided (Figs. 45, 46) which may be clamped to the angle 108 and member 112 at any place along the length of the main frame. The member 435 is clamped at a predetermined distance beyond the last comb recess which is to receive a fin in the manufacture of the particular coil in process. In other words, it is clamped a distance from the left hand end of the combs, as seen in Fig. 45, equal to the left of fin bank to be assembled plus the requisite distance necessary to allow for the carriage stopping mechanism, which may be designated as so many inches or comb grooves.

A clamp 437 is provided for securing the member 435 in place. Slidably supported in the vertical legs of member 435 is a rod 439 to which is secured a collar 441. A compression spring 443 is disposed around rod 439 between the collar 441 and one leg of the member 435, the spring thus tending to force the left hand end, as viewed in Fig. 45, toward the left.

Extending horizontally from the forward side of front plate 272 of the carriage is a bracket 445 upon which is pivotally mounted an arm 447, the lower end of which is disposed so as to strike the end of rod 439 when the carriage has traveled a sufficient distance along the frame. A lever 449 is pivotally connected to lever 447 at one end and to another lever 451 at the other end, the latter lever being pivoted to bracket 445. A tension spring 453 is connected to bracket 445 and to the pivot between levers 449 and 451, and tends to move these levers in a direction so as to pivot lever 447 in a counterclockwise direction as shown in Fig. 45. Lever 451 is provided with a flange 455 which is movable upon pivoting of the lever 451 in a clockwise direction, into the path of travel of the lower end of the clutch throw arm 294. Flange 455 is so positioned transversely of the carriage that, when arm 294 contacts it, the arm is held in a neutral position, that is, in such a position as to maintain the clutch teeth 238 and 240 out of engagement with the teeth on clutch members 242 and 304, respectively.

The run-out frame

Connected to and forming an extension of the main frame is a run-out frame, which is shown in the right hand portions of Figs. 4 and 11, and in Figs. 5, 6, 7, 12, 13 and 14. Angles 100 of the main frame are continued throughout the length of the run-out frame, as are angles 108. Vertically extending channels 484 connect angles 100 and 108, and these channels extend above angles 108, where the channels on opposite sides of the run-out frame are connected by transverse channels 486. Transverse angles 104 connect the lower portions of the channels 484. Secured to angles 104, as by welding, are spaced parallel channels 488 (Figs. 48 and 51) which serve as tracks on which run a puller head, designated generally by reference character 490.

The puller head includes a channel 492 of a length substantially equal to that of the run-out frame. The flanges of the channel support flanged rollers 494 which run on the tracks formed by channels 488. Secured to the back of the web of channel 492 is a rack 496, which extends the entire length of the channel. This rack is engaged by a pinion 498 secured to a shaft 500 mounted in stationary bearings 502 which are supported on the upper horizontal flanges of short channel pieces 504. Channels 504 are supported on the transverse angle 104a which extends transversely between the two vertical channels 102 which are located at the juncture of the main frame and the run-out frame. Angles 104a differ from the other angles 104 by being extended beyond the side of the frame to form a portion of a motor base. The extended end of angle 104a is supported by means of a channel 506 extending to the floor. A similar angle 104b is secured to channels 488 at some distance from angle 104a and forms another portion of the motor base. The extended end of angle 104b is likewise supported by means of a channel 508.

Mounted on the base formed by angles 104a and 104b is an electric motor 510 and a gear reduction box 512. A power shaft 514 extends from the side of gear box 512 in axial alignment with shaft 500. Shaft 514 carries one member 516 of a dog clutch. The other member 518 of the clutch is keyed to shaft 500, but is axially slidable thereon. Mounted in an annular groove formed in the shank 520 of clutch member 518, is a clutch collar 522 with respect to which the shank 520 is rotatable. Collar 522 carries pins 524 which engage in slots formed in a clutch throw arm 526. The lower end of arm 526 is pivoted at 528 to the motor base, while the upper end is pivotally connected to one end of an arm 530 of a toggle mechanism. The opposite end of arm 530 is pivotally connected at 532 to the other arm 534 of the toggle, which other arm is pivoted at 536 to a member 537. Member 537 is pivoted on a horizontal pin 539 to a fixed member on the frame. A bar 538 is secured to the pivot pin 532 of the toggle. A tension spring 540 is connected between one end of bar 538 and a bracket 542 fixed to the frame. A cable 544 has one end connected to bar 538 and extends the entire length of the main frame, and has its other end anchored to the transverse angle 106 (Fig. 8) at the far end of the main frame. Arms 530 and 534 of the toggle are provided with pins 546 (Fig. 52) which contact the bar 538 to limit movement of the toggle arms in one direction, and which engage in recesses 548 formed in the ends of the arms to limit their movement in the opposite direction.

A forked retaining guide 531 extends from the frame on either side of arm 526. Rollers 533 are suitably mounted on arm 526 and roll on inner surfaces of the forked guide. This structure serves to limit movement of arm 526 to a plane transverse of the frame.

Motor 510 may rotate in either direction and a three-position switch 550 (Fig. 3) is connected in the motor circuit and is mounted on one of the channels 102. Switch 550 is formed with an operating shaft 551 which carries a switch arm 552 to which is connected a rod 554 which extends the entire length of the main frame and is slidably supported in eye bolts 556. When the switch arm 552 is in a central position, the motor circuit is open. When the arm is pivoted to one side of this position, the motor rotates in one direction, while if the arm is pivoted to the other side the motor rotates in the opposite direction.

The teeth on the dog clutch members 516 and 518 are formed with inclined faces on one side and straight faces on the other side. Consequently, when the direction of rotation is such that the inclined faces of the teeth are transmitting the torque, there is a tendency for the teeth to be forced out of mesh, whereas when the straight sides of the teeth are transmitting torque, there is no such tendency. A tension spring 564 is connected between the upper end of clutch throw arm 526 and the frame and tends to disengage the clutch at all times.

The right hand end of the puller head as viewed in Figs. 7 and 14, includes a vertically extending channel 566 which is braced by an inclined channel 568. Welded to the flanges at the upper end of channel 566 is a plate 570 which carries angle brackets 572 on which are rotatably mounted flanged rollers 574. These rollers engage underneath the horizontal flanges formed on angles 108 of the run-out frame.

The upper end of the web of channel 566 is formed with a slot 576 (Fig. 48) and plate 570 is formed with a plurality of spaced apertures 578 in alignment with slot 576. A pair of expander rods 580 have nuts 582 threaded on their ends. Rods 580 are formed with bores 584 (Fig. 49) in which are slidably received pins 586, compression springs 588 being located in the bores. Pins 586 are formed with ends 590 having a reduced diameter substantially equal to the diameter of holes 578. The expander rods 580 may be slid downwardly into slot 576, with the pins 586 retracted. These pins are then inserted in the proper holes 578 so as to give the desired vertical spacing of the expander rods.

The expander rods are somewhat longer than the runout frame and at their opposite ends are tapped to receive expander heads 592.

A pair of trolleys 612 and 614 (Figs. 13, 14) are provided for supporting intermediate points of the expander rods 580. Each trolley includes side plates 616 secured together by means of a transverse plate. As seen in Fig. 50, the transverse plate 618 of trolley 612 is of different shape and extent than plate 619 of trolley 614. The side plates carry flanged rollers 620, one pair of which run on the upper side of the horizontal flange of angles 108 of the run-out frame, and the other pair of which engage underneath these flanges. Transverse plates 618 and 619 are formed with slots 622. Bolted to one side of each plate are members 621 extending along the sides of the slots and forming with the plate vertical grooves. Two blocks 623 are disposed in each slot and are provided with vertical flanges slidable in the grooves. Each block is formed with an aperture through which extends an expander rod 580, the blocks thus serving to support the rods while permitting limited vertical movement thereof.

Fixed to the frame at the juncture of the main and run-out portions is a pair of tie rods 625, the opposite ends of which are formed with heads 627. These rods slide through apertures formed in transverse plate 619 of trolley 614. These tie rods have a length approximately one-third of the length of the run-out frame. A pair of similar tie rods 630 are fixed to plate 619 above the apertures for rods 625. The opposite ends of rods 630 are provided with heads 631 and these rods slide in apertures formed in plate 618 of trolley 612.

Fixed to the transverse plate 618 of trolley 612 above the apertures for rods 630 are tie rods 624. These rods likewise have a length approximately one-third the length of the run-out frame and slidably extend through holes in plate 570 of the puller head. Rods 624 are provided with heads 626 which limit relative movement between the rods and the puller head.

The operating shaft 551 of switch 550 (Fig. 3) is provided with a downward extension 636 (Fig. 10), the lower end of which is rotatably supported in a bracket 638 and carries a horizontal arm 640. A bracket 642 (Figs. 6, 13) is secured to the side of channel 492 of the puller head in a position such that it strikes arm 640 as the puller head moves into the main frame. Bracket 642 is so positioned lengthwise of channel 492, with regard to the position of arm 640, that the bracket strikes the arm to open switch 550 and stop the puller head in a position such that the expander heads are at the end of the trough formed by comb sections 140.

*Operation of the fin depositing carriage*

The fins 684 are made of comparatively thin sheet metal formed with pockets as is shown in Figs. 29, 30 and 31. The fins are formed in a separate punch press operation. The dishing of the fin plates is symmetrical so that the fins have an overall width materially greater than the thickness of sheet used. The pockets or indentations may be of any desired shape and may cover the entire surface of the fin. As shown they are square. Also, the fins are formed with two spaced apertures 686 (Fig. 18) located on the vertical center line of the fin. The diameter of these apertures is slightly greater than the original diameter of the tube to which the fins are later to be secured. The fins are preferably supplied stacked in packages including cardboard tubes extending through the apertures 686. Wooden plugs having enlarged heads may be inserted in the ends of the tubes to retain the fins in place thereon. The plugs in at least one end of the tubes are easily removable and are preferably marked "Front," indicating that this end of the stack is to be placed toward the front in the fin magazine of the fin depositing carriage.

To load the magazine of the fin depositing carriage, the flanges 344 (Fig. 24) forming the sides of the magazine are adjusted to the proper spacing for the size of the fins which it is desired to use, as has been previously described. The magazine is then loaded by pulling the arm 354 and the trolley 356 to the rear of the carriage and placing a package of fins, from which the plugs in the front ends of the cardboard tubes have been removed, in the magazine, the fins standing vertically on edge and being supported by the rods 350 in the bottom of the magazine. The cardboard tubes are then removed by withdrawing them rearwardly. The arm 354 is then released and the weight 378 pulls the trolley 356 toward the front of the carriage until the arm 354 contacts the back of the fin pack. The weight continuously urges the arm against the fins, thus tending to feed the latter forward in the magazine.

Under the influence of the weight 378 acting on the arm 354, the first fin is held against the front plate 272 of the carriage. This plate is formed with a vertically extending slot 273 in alignment with the center line of the fin depositing chain 246 and of such a width (see Fig. 32) that the fingers 286 may move therein. The length of these fingers is such that they extend through the slot 273 and engage in one of the pockets formed in the fin, as is shown in Figs. 30 and 31. The cam plate 254 may be adjusted by means of the winged members 262 on eccentric bolts 260 so as to cause the fingers 286 to project a greater or less distance through the slot 273. By adjusting the cam plate upwardly or downwardly in the slots 261 of the arms 250 the vertical point at which the fingers 286 engage the fins may be varied. It should be so adjusted for each size of fin that the fingers engage the fin above the upper aperture 686. The bottom plate 212 of the carriage is provided with a slot 275 in its forward edge adjacent to the front plate 272 (Fig. 26). The lateral dimension of this slot is at least as great as the width of the widest fin which it may be desired to use, and the thickness of this slot is slightly greater than the overall thickness of one fin, but less than the overall thickness of two fins, whereby only one fin may pass through it at a time.

The fin depositing carriage is placed at the left end of the main frame with the slot 275 over the first pair of grooves of the comb sections. The electric motor 226 is started by closing its switch and drives the sprocket 232 through the gearing 230 and 234. The sprocket 232 is in its left hand position, as shown in Fig. 29, with the clutch teeth 238 in engagement with the clutch member 242 which causes shaft 236 to rotate. Rotation of this shaft causes sprocket 244 to drive the fin depositing chain 246. The direction of rotation of the motor is such that the left hand run of the chain, as viewed in Fig. 30, moves downwardly. This causes a fin depositing finger 286 to enter the top of slot 273 in the front plate and to engage in one of the pockets formed in the forwardmost fin. The finger 286 thus causes this fin to move downwardly through the lower slot 275 and into the comb grooves therebelow. The chain 246 continues to travel until the fin is moved all the way down into the comb trough. In Fig. 30 a plurality of fins are shown in this position, and the last fin to the right is shown just before it reaches the bottom position.

Just before the chain has moved a sufficient distance to properly deposit the fin, one of the pins 288 (Fig. 29) projecting from the side of the chain strikes the end of bell crank lever 394 and rotates this lever in a counter-clockwise direction, as viewed in Fig. 29. This rotation causes arm 396 to rock bell crank lever 398 and the rock shaft 400 in a clockwise direction against the tension of spring 432 to the position shown in Fig. 39. This movement of lever 398 causes its opposite end to move collar 422 in a direction to compress spring 430 carried on rod 424. Thus a force is created tending to rotate lever 294 in a clockwise direction, as viewed in Fig. 29. However, such movement of lever 294 for the instant is not possible because arm 436 is in abutting contact with projection 434 on arm 294. The above operation and those which follow may be more clearly understood if reference is also had to Fig. 47, which is a more or less diagrammatic view, but which shows the relationship of the various elements.

During the fin depositing operation just described, the reduced portion 444 of locating pin 442 has been in engagement with one of the holes 392 in index wheel 390, thus locking the wheel against rotation, as shown in Fig. 34. Inasmuch as wheel 390 is keyed to shaft 384 which carries the pinion 388, which pinion engages the rack 114, the carriage is locked against movement. The parts are so constructed that when pin part 444 is in any hole 392, slot 275 of the carriage is in alignment with a fin receiving pocket of the comb structure. Rotation of the rock shaft 400, caused as above described by the pin 288 striking bell crank lever 394, causes the arm 450 (Fig. 34), which is keyed to the rock shaft, to rotate in a counter-clockwise direction, as viewed in Fig. 34, so as to withdraw the reduced portion 444 of pin 442 from engagement in the hole 392, the pin being retracted to the position shown in Fig. 43. When this occurs, the lever 454 (Fig. 44) under the influence of spring 460 pivots in a clockwise direction, from the position shown in Fig. 38 to the position shown in Fig. 44, so that the roller 458 engages the shoulder 443 formed on the pin 442 adjacent to the reduced portion thereof, thus holding the pin in retracted position, as shown in Fig. 43, and locking the rock shaft 400 in the position to which it was moved by rotation of bell crank lever 398.

In the meantime pin 288 on the chain has traveled an additional distance and strikes lever 436 (Fig. 40), thus pivoting this lever out of engagement with projection 434 on the clutch throw lever 294, as shown in Fig. 40. The pins 288 are so located on the chain 246 with respect to fingers 286 that the pin strikes lever 436 at the instant the finger has moved a fin to the bottom of the comb trough.

Spring 430 now forces rod 424 to the left, as viewed in Fig. 40, which rotates the clutch throw arm in a counter-clockwise direction so as to disengage the clutch teeth 238 from the clutch member 242 (Fig. 29) and to engage the teeth 240 with the teeth on member 304. The latter member is keyed to the shaft 300 which carries the step pulley 306, which pulley is consequently driven inasmuch as the motor 226 continues to rotate through the fin depositing operation. Shaft 310 is thus driven through the belt 314 and the step pulley 312. Shaft 310 carries the spiral gear 316 which meshes with the spiral gear 318 mounted on shaft 320. This shaft also carries the worm 380 (Fig. 27) which meshes with the worm gear 382 mounted on the shaft 384, which shaft is consequently rotated. Pinion 388 rotates with this shaft and, inasmuch as it engages the rack 114 on the frame, it causes the carriage to travel forwardly.

The aforementioned rotation of rock shaft 400, which served to retract pin 442, also served to pivot arm 476 in a clockwise direction, as viewed in Fig. 35. This motion of arm 476 moved arm 470 to the left, as viewed in this figure, through the medium of spring 478. Thus the lever 471, shaft 469 and lever 468 are pivoted in a counter-clockwise direction, which moves arm 466 to the right, as viewed in Fig. 35, or to the left, as viewed in Fig. 43. This movement of arm 466 forces the end of trip pin 480 from the position shown in Fig. 34 to the position shown in Fig. 43, in which latter position it is against the face of the index wheel 390, and the tension imposed on spring 478 by movement of arm 476 holds the member 480 against the face of the wheel. During the forward travel of the carriage, wheel 390 is rotated, inasmuch as it is mounted on shaft 384, and when the next opening 392 is rotated into alignment with trip pin 480, the pin is projected into it by the tension of spring 478. As the pin 480 is in engagement with a hole in the rotating wheel 390, the pin is pulled downwardly and pulls lever 466 downwardly against the force of spring 482, the lever 466 pivoting about its connection with lever 468, and without altering the position of lever 468. Downward movement of the lever 466 causes the roller 464 carried thereby to contact the cam surface 462 on lever 454, thus camming this lever to the left from the position shown in Fig. 44 to the position shown in Fig. 38. The roller 458 carried by lever 454 is thus withdrawn from engagement with the shoulder 443 on pin 442, thus releasing pin 442 and allowing it and the rock shaft 400 to move under the influence of spring 432 which has been exerting tension on these parts. Spring 432 (Fig. 29) now rotates rock shaft 400 in counter-clockwise direction, as viewed in Fig. 29, which is a clockwise direction as viewed in Fig. 43. Arm 450 thus projects the pin 442 from the position shown in Fig. 43 until the reduced portion thereof strikes the face of the index wheel 390, as is shown in Fig. 41. This movement of the rock shaft also rotates lever 476 in counter-clockwise direction, as viewed in Fig. 35, thus moving the linkage 470, 471, 469, 468 and 466 so as to withdraw the trip pin 480 from engagement with the hole 392 in the index wheel whereupon spring 482 pulls lever 466 up to the position shown in Fig. 41. This movement of the rock shaft 400 has moved the slidable collar 442 from the position shown in Fig. 10 to that shown in Fig. 42, that is, with the collar abutting against the lock nuts 426 on the rod 424 but without moving rod 424. The end 444 of pin 442 rides against the face of index wheel 390 until the next hole 392 advancing toward it comes into alignment with the reduced portion 444 of the pin, whereupon spring 432 (Fig. 29) rocks the shaft 400 further so as to project the reduced portion 444 into the hole 392 as shown in Fig. 34, thus arresting rotation of the index wheel and stopping travel of the carriage. This further rotation of rock shaft 400 also causes collar 442 to move rod 424 to the right from the position shown in Fig. 42 to the position shown in Fig. 29, thus shifting the clutch so as to disengage teeth 240 from the teeth on clutch member 304 and to engage the teeth 238 with the teeth on member 242. The carriage has now moved forward a certain distance and is ready to deposit another fin.

The distance the carriage travels is determined by the spacing of the holes 392 in the index wheel 390. As previously stated, there is a plurality of circular rows of holes in the wheel. In any one row the holes are spaced equidistant apart, and the holes in any one row are spaced differently than the holes in any other row. Consequently, the travel of the carriage per step depends upon which row of holes the locating pin 442 and the trip pin 480 are aligned to engage. Inasmuch as bracket 416, which carries the pin 442 and the pin 480 and connected mechanism, is slidable longitudinally of the carriage, this bracket may be adjusted so as to align the pins with any one of the several rows of holes.

The spacing of the holes in the different rows is so selected, with respect to the pitch of the teeth on the pinion 388 and the rack 114, and with respect to the spacing of the grooves 148 in the comb 140, that when the carriage is stopped by the engagement of pin 442 in a hole 392, the slot 275 is always directly in alignment with a groove 148 in the comb.

The above described operations are repeated continuously and automatically, the mechanism first causing a fin to be deposited and then the carriage travels the desired distance, and another fin is deposited. This is continued until a sufficient number of fins have been deposited, with regard to the length of the coil desired. The fins are fed forwardly in the magazine of the carriage by means of arm 354 on trolley 356 and also by the feed rollers 342, which are rotated through gears 336 and 338 from shaft 320 during each period of forward travel of the carriage.

As previously described, the U-shaped member 435 is clamped to the main frame in such a position that it will stop the operation and travel of the carriage after the desired number of fins has been deposited. The operation of this automatic stop is as follows:

Whenever the carriage is traveling forwardly, the clutch throw arm 294 is in the opposite position from that shown in Fig. 29, namely, with its lower end displaced to the left as viewed in this figure, so that its upper end maintains the clutch teeth 240 in engagement with the teeth on clutch member 304. In this position of the lever 294, its lower end is displaced a short distance to the left of the flange 455 as shown in Fig. 29. When, during travel of the carriage, the lower end of lever 477 strikes the end of rod 439 (see Fig. 45), the lever 477 is pivoted in a clockwise direction, thus pivoting lever 451 to a substantially vertical position against the force of spring 453. Spring 453 is weaker than spring 443, whereby lever 451 may be pivoted without any substantial compression of spring 443 taking place. The flange 455 is now in alignment with the lower end of clutch throw arm 294. However, if the reduced portion 444 of pin 442 has not yet engaged one of the holes 392 in the index wheel 390, the carriage continues to travel until rotation of the index wheel is arrested by engagement of the reduced portion of pin 442. This travel is permitted by compression of spring 443, which permits rod 439 to be displaced to the right, as viewed in Fig. 45. Member 455 cannot move beyond its position of alignment with clutch throw arm 294 because of abutment with the fixed part of the carriage. However, as soon as pin 442 is projected to engage the index wheel, and rock shaft 400 is rotated so as to pivot lever 398 in a counter-clockwise direction, as shown in Fig. 29, which in turn tends to pivot clutch throw arm 294 in a counter-clockwise direction, the lower end of this clutch arm strikes flange 455 after the clutch arm has moved a sufficient distance to disengage clutch teeth 240 from the teeth on clutch member 304, but before it has moved a sufficient distance to engage the clutch teeth 238 with the teeth on member 242. Consequently, the clutch is maintained in a neutral position and the electric motor 226 runs idle until the operator opens its electric circuit manually.

The desired number of fins have now been deposited in parallel relation within the grooves of the combs and the fin depositing carriage has been brought to a stop at some position along the main frame over the comb sections. In order to move the carriage back to its starting position, arms 250 are released by lifting plate 276 (Figs. 29, 33) upwardly by means of pin 278. The arms then may be pivoted upwardly about the boss on sprocket 244 until pin 264 is engaged by hook 282, which retains the arms in raised position (Fig. 17). Nut 332 is now loosened (Fig. 27) by means of handle 334 (Fig. 18) and the bearing support 324 is lowered, thus disengaging the worm 380 from worm wheel 382. Lever 463 (Figs. 34-36) is pivoted about screw 465 against the tension of spring 473 to bring the lower end of the lever into alignment with abutment 467 on arm 466. The lever is then turned in a counter-clockwise direction, as viewed in Fig. 34, so as to rotate rock shaft 400 and arm 450 in the same direction, thus retracting locating pin 442 from the hole in index wheel 390. At the same time, the lower end of lever 463 strikes abutment 467 and moves arm 466 to the right, as viewed in Fig. 34, to move trip pin 480 farther away from the index wheel. This movement of arm 466 rotates levers 468 and 471 counter-clockwise, as viewed in Fig. 34, which is clockwise as viewed in Fig. 35, thus moving arm 470 to the right, as viewed in Fig. 35. Arm 476 is rotated clockwise, as viewed in Fig. 35, by the rotation of the rock shaft 400, the opposite movements of arm 476 and lever 470 being permitted by pin 474 sliding in the slot 472, spring 478 being thus stretched. The shaft 384, which carries the worm wheel 382, the index wheel 390, and the pinion 388 is now free to rotate and the carriage may be returned to its starting position by merely pushing it backward along the frame, lever 463 being held by hand in the above described position to disengage pins 442 and 480 from the index wheel. Inasmuch as the pinion 388 is in engagement with the rack 114, the pinion will be rotated and will rotate worm wheel 382, shaft 384, and index wheel 390, but as just explained, these parts are now entirely disconnected from the other parts and may rotate idly.

Fabrication of finned hairpins

A return bend is soldered or otherwise secured to the ends of straight tubings which have been inserted through openings 686 to form what is termed a hairpin.

The hairpin is then inserted into the aligned openings 686 of the fins 684 which are secured in spaced relationship in the combs 140. The hairpin is inserted until the return bend thereof is a short distance to the left of the clamping device 171 shown in Fig. 8. Two holding blocks 784 and 786, having semi-circular grooves 788 in their mating surfaces, as is shown in Figs. 19 and 20, are then placed around the return bend, the return bend being thus disposed within the groove 788. The hairpin with the holding blocks 784 and 786 secured around the return bend is then slid further to the right until the blocks are within the clamping device 171. Lever 180 is then rotated in a counter-clockwise direction, as shown in Fig. 20, so that cam 178 presses the holding block 786 against the block 784 and presses this latter block against the fixed clamping plate 172. The forward edge of blocks 784 and 786 abut against the inturned abutments 174 and 179, whereby further movement of the hairpin in this direction is prevented. The ends of the hairpin are now projected some distance beyond the last fin.

Operation of the tube expanders

The next step is to expand the tubes 688 within the holes 686 in the fins 684. To accomplish this the rod 554 (Figs. 1, 2, 3) is moved in the proper direction so as to throw switch 550 (Fig. 3) in the motor circuit 510 in the direction to cause the motor to rotate in a direction such that shaft 500 will rotate in a clockwise direction, as shown in Fig. 11. After the motor has started, cable 544 is pulled so as to straighten out the toggle links 530 and 534, thus moving the clutch arm 526 in a direction so as to engage the dog clutch members 516 and 518. The engagement of the clutch causes the shaft 500 to rotate in a clockwise direction, as viewed in Fig. 11, which in turn causes pinion 498, which engages rack 496, to move the puller head 490 to the left, as viewed in Fig. 11. Inasmuch as the expander rods 580 are secured to the puller head, they are caused to move in the same direction. The expander rods 580, while in the run-out frame, are supported at intermediate points along their length by means of the trolleys 612 and 614 (Figs. 5, 6). If the length of the coil being constructed is comparatively short, its end will be spaced a considerable distance from the end of the run-out frame and it is necessary to provide means for supporting the expander rods at one or more places along the length of the main frame before they reach the ends of the coil. Such support is provided by a plate 824 (Figs. 4, 11, 23) which may be inserted in the comb trough. The central portion of the plate 824 is formed with apertures for guiding the expander rods 580. The vertical edges of the plate are comparatively thin so that they may be inserted in the grooves 148 of the comb sections 140. A handle 826 is provided for inserting and removing the supporting plate 824. None or one, or more of the supporting plates 824 may be employed, depending upon the distance between the end of the run-out frame and the end of the coil which is being manufactured. Several sets of plates 824 are provided, the plates of different sets being of different widths and having apertures spaced on different centers, corresponding to the difference between tube centers of the various hairpins which it is desired to manufacture in the machine.

As the puller head advances toward the left, the trolleys 612 and 614 support the expander rods 580 at intermediate points along their lengths. During the first part of this movement of the puller heads, the tie rods 624 slide in the brackets 626, the trolleys remaining stationary. After the puller head has moved about one-third of the length of the run-out frame, it strikes the trolley 612 and this trolley is pushed along ahead of the puller head, the tie rods 630 sliding in the apertures in plate 618. When the trolley 612 strikes the trolley 614, the latter is pushed along, the tie rods 625 sliding in the apertures in the plate 619.

In the meantime the expander heads 592 have been guided into the open ends of the hairpin. The puller head and expander rods are moved to the left until the ends of the expander heads have passed beyond the last fin adjacent to the return bend. The construction of the expander heads is such that they may pass through the tubes in this direction without expanding them. The motor 510 is then automatically stopped by the bracket 642 (Fig. 6) on the puller head channel 492 striking the arm 640 (Fig. 10) on shaft extension 636 of switch 550 to open the switch. The clutch between the motor and shaft 500 is then disengaged by the operator releasing cable 544 and rod 554 is then moved so as to cause the motor to rotate in the reverse direction. The clutch is again engaged by pulling on the cable 544, and consequently the shaft 500 is driven in a direction such as to move the puller head away from the main frame. It will be noted that, for this direction of rotation, the torque is transmitted through the straight axial faces of the teeth formed on clutch members 516 and 518. Consequently, there is no inherent tendency for the clutch to disengage. However, the force of springs 540 and 564 tend to disengage the clutch, but during the expanding operation the clutch transmits so much torque that the friction between the teeth on clutch members 516 and 518 is so great that the springs 538 and 564 are not able to disengage the clutch.

As the puller head withdraws the expander rods from the tubes, they expand the walls of the tubes and force the outer surface of each tube tightly against the material of the fins 684 surrounding the holes 686 therein.

As soon as the expander heads have been withdrawn from the ends of the tubes, the force required to move the puller head is greatly reduced and the torque transmitted through the clutch is reduced to such an extent that the springs 540 and 564 are able to disengage the clutch. Consequently, movement of the puller head is automatically stopped as soon as the expander heads have been withdrawn from the tubes, regardless of the length of the particular tubes being operated upon. After the clutch has been disengaged, the motor 510 runs idle until the operator interrupts its circuit by means of the switch rod 554. It will be noted that this switch rod and the cable 544 for operating the clutch extend the entire length of the main frame, whereby these elements may be controlled from any position along the main frame.

As the puller head moves out, the trolleys 612 and 614 may remain stationary near the end of the run-out frame until the puller head has traveled a distance equal to the length of tie rods 624. When the heads 625 on these tie rods are contacted by the part 570 of the puller head, the rods 624 are forced to travel with the puller head and consequently pull the trolley 612 along on the run-out frame. When the puller head has moved an additional distance equal to the length of tie rods 630, the heads 631 thereon are contacted by the plate 618 of the trolley 612 and rods 630 are caused to move with the trolley 612, thus pulling the trolley 614 along the run-out frame. It will be noted that, during both the in and out movement of the expander rods the greatest unsupported length of the expander rods in the run-out frame is equal to approximately one-third the length of the frame. This is sufficient to prevent buckling or undue sagging of these rods. Tie rods 625 between trolley 614 and the frame are provided to prevent the possibility of the trolleys moving all the way back with the puller head, due to friction on the tie rods 624 and 630.

After the expander rods have been withdrawn from the tubing, the handle 180 (Fig. 20) of the clamping device 171 is rotated so as to release the blocks 784 and 786. Thereupon, the finished hairpin, now consisting of the straight portions connected by means of the return bends and securely expanded against the fins 684, may be removed from the comb trough by rotating shaft 186 by means of handle 210 so that cams 206 raise bar 208. Bar 208 contacts the lower edges of the fins and also the lower edges of blocks 784 and 786 and hence raising of the bar lifts the hairpin upwardly.

It is to be understood that the foregoing description has been given for purposes of illustration only as showing preferred embodiments of the various structures in accordance with my invention, as is required by the patent statutes. It is not to be considered as limiting the scope of my invention, which is to be determined by the appended claims.

What is claimed is:

1. In a machine for fabricating finned structure, a frame, fin retaining means mounted on said frame and providing spaced grooves for receiving edge portions of the fins, a carriage mounted to travel along said retaining means, means for causing travel of said carriage, a magazine on said carriage for holding a plurality of fins, and means on said carriage for removing fins from said magazine and depositing them in the spaced grooves in said retaining means.

2. In a machine for fabricating finned structure, a frame, fin retaining means mounted on said frame and providing spaced grooves for receiving edge portions of the fins, a carriage mounted to travel along said retaining means, means for causing travel of said carriage, a magazine on said carriage for holding a plurality of fins, means on said carriage for automatically transferring fins from said magazine to the grooves of the retaining means at predetermined space intervals, and means for varying said space intervals.

3. In a machine for fabricating finned structure, a frame, fin retaining means mounted on said frame and providing spaced grooves for receiving edge portions of the fins, a carriage mounted to travel along said retaining means, means for causing travel of said carriage, a magazine on said carriage for holding a plurality of fins, means on said carriage for removing one fin at a time from said magazine and depositing it in a groove of said retaining means, and automatically operating means for determining the distance said carriage travels between consecutive fin depositing operations.

4. In apparatus of the character set forth, a frame, pairs of members mounted on said frame on opposite sides of a center line for forming pockets for fins, both members of each pair being movable relative to said frame to vary the space between said members to form pockets of different size to receive fins of different size, means for maintaining the members of each pair equi-distant from said center line, and means for fixing said members to said frame in adjusted position.

5. In a machine for spacing fins, a frame, members mounted on said frame forming pockets for fins, a fin magazine movably mounted on said frame, means for moving said magazine on said frame along said members, means carried by said magazine for engaging fins in said magazine to transfer fins from said magazine to said pockets, means to adjust said members to vary the pocket size for different sized fins, means to adjust walls of said magazine to carry fins of different size, and said transfer mechanism being so located with respect to said magazine as to engage the fins near their centers, whereby the mechanism will transfer fins of different size without adjustment.

6. In a machine for fabricating finned structure, a frame, fin retaining means mounted on said frame and providing spaced grooves for receiving edge portions of the fins, a carriage mounted to travel along said retaining means, means for causing travel of said carriage, a magazine on said carriage for holding a plurality of fins, means on said carriage for transferring fins from said magazine to the grooves of the retaining means at spaced intervals, and means actuated by the travel of said carriage for automatically rendering the fin transfer means inoperative after fins have been deposited along a predetermined length of said retaining means.

7. In a machine for fabricating finned structure, a frame, retaining means for fins mounted on said frame, a carriage mounted to travel on said frame along said retaining means including a fin magazine, mechanism for transferring fins from said magazine to said retaining means, carriage driving mechanism, a source of power, means for connecting said source of power alternately to said fin transfer mechanism and to said carriage driving mechanism, and means for disconnecting said source of power from said carriage driving mechanism and said fin transfer mechanism when said carriage has traveled a predetermined distance along said frame.

8. In a machine for fabricating finned heat exchangers, a frame, retaining means for fins mounted on said frame, a carriage mounted to travel on said frame along said retaining means, fin depositing mechanism on said carriage for depositing fins in said retaining means, carriage driving mechanism, a source of power, means for automatically disconnecting said source of power from said fin depositing mechanism and connecting it to said driving mechanism when a fin has been deposited, means for disconnecting said source of power from said driving mechanism and connecting it to said fin depositing mechanism after said carriage has traveled a predetermined distance, and means for disconnecting said source of power from said carriage driving mechanism without connecting it to said fin depositing mechanism after said carriage has traveled a predetermined distance along said frame.

9. In a machine for fabricating finned structure, a frame, fin retaining means secured to said frame, carriage mechanism arranged to travel on said frame, a fin magazine on said carriage adapted to hold fins stacked in a predetermined order, movable fin transfer mechanism on said carriage mechanism, and fin engaging means carried by said transfer mechanism, said transfer mechanism being so arranged with respect to said magazine that said fin engaging means engages the first in order of the fins in the magazine and deposits such fin in said fin retaining means.

10. In a machine for fabricating finned heat exchangers, frame members, fin retaining means secured to said frame members, carriage mechanism arranged to travel on said frame members, a fin magazine on said carriage mechanism including bottom, side and front members, said bottom member being formed with a passage adjacent to said front member of greater width than the thickness of a single fin and of less width than the thickness of two fins, said front member being formed with a vertically extending passage, a traveller movably mounted on said carriage mechanism and disposed to run parallel to the passage in said front member, and a projection carried by said traveller and arranged to enter the passage in said front member for engaging a fin to move the fin downwardly through the bottom passage and deposit it in said retaining means.

11. In a machine of the character set forth, a supporting structure, fin receiving means mounted thereon, a travelling fin holder movable on said structure relative to said fin receiving means, means for moving said fin holder, a transfer mechanism having a part adapted to engage a fin in the fin holder and move such fin to the fin receiving means, and means to vary the point of engagement of said fin engaging part of the transfer mechanism with a fin in the fin holder.

12. In a machine for fabricating finned structure, frame members, fin retaining means carried by said frame members, carriage mechanism arranged to travel on said frame members, means for causing travel of said carriage mechanism, a fin magazine on said carriage mechanism, fin transfer mechanism mounted on said carriage for transferring fins from said magazine to said retaining means, means for driving said fin transfer mechanism, and means responsive to a predetermined movement of said fin transfer mechanism to stop movement thereof.

13. In a machine for fabricating finned structure, frame members, fin retaining means carried by said frame members, carriage mechanism arranged to travel on said frame members along said fin retaining means, a fin magazine on said carriage mechanism, fin transfer mechanism for transferring fins from said magazine to said fin retaining means, means for driving said fin transfer mechanism, means for driving said carriage mechanism, and means responsive to a predetermined movement of said transfer mechanism for stopping movement of the transfer mechanism and causing the driving means to produce movement of the carriage mechanism.

14. In a machine of the character set forth, a frame, a jig on said frame for holding fins to be assembled, a fin magazine movable on said frame relative to the jig, means to lock the magazine to the frame in predetermined positions relative to the jig, fin transfer mechanism carried by said magazine for transporting fins from the magazine to the jig, a member in the path of travel of said transfer mechanism and means operable by movement of said member to cause unlocking of the magazine from the frame, stopping of the transfer mechanism, and to initiate relative movement between the magazine and jig.

15. In a machine of the character set forth, a frame, a jig on said frame for holding fins to be assembled, a fin magazine movable on said frame relative to the jig, means to lock the magazine to the frame in various predetermined positions relative to the jig including a wheel and a lock piece engageable with the wheel, fin transfer mechanism movable between the magazine and jig, a member arranged to be contacted and moved by said transfer mechanism and means responsive to movement of said member to disengage the lock piece from the wheel and initiate relative movement between the magazine and the jig.

16. In a machine of the character set forth, a frame, a jig secured to said frame for holding fins to be assembled, a fin magazine movable on said frame relative to said jig, fin transfer mechanism carried by said magazine movable to transfer fins from the magazine to the jig, locking mechanism for fixing given positions of the magazine relative to the jig, a spring, a first actuator disposed in the path of travel of said fin transfer mechanism and operable by contact with said fin transfer mechanism to cause disengagement of said locking mechanism and to stress said spring, a second actuator disposed in the path of travel of said fin transfer mechanism and operable by contact therewith to release said spring, and means actuated by the release of said spring to stop movement of said fin transfer mechanism and cause relative movement of the magazine and jig.

17. In a machine for fabricating finned heat exchangers, a frame, a carriage arranged to travel on said frame, driving mechanism for said carriage, a wheel driven by said mechanism and formed with a circular row of equally spaced recesses, a pin disposed in alignment with said row, means to move said pin into successive recesses of said row to periodically lock said wheel against rotation, and means to disengage said pin from said recess to unlock said wheel, whereby the wheel is alternately locked and unlocked.

18. In a machine for fabricating finned heat exchangers, a frame, a carriage arranged to travel on said frame, driving mechanism for said carriage, a wheel driven by said mechanism and formed with a plurality of circular rows of recesses, the recesses in any one row being equally spaced and the spacing of the recesses in one row being different than in the other rows, a movable pin, means for aligning said pin with any of said rows, means to move said pin into successive recesses of the row with which it is aligned to periodically lock said wheel against rotation, and means to disengage said pin from said recesses, whereby the wheel is alternately locked and unlocked.

19. In a machine for fabricating finned heat exchangers, a frame, a carriage arranged to travel on said frame, driving mechanism for said carriage, a wheel driven by said mechanism and formed with a circular row of equally spaced recesses, a pin disposed in alignment with said row and movable to engage any of said recesses to hold said wheel against rotation, means to retract said pin from engagement with a recess to unlock the wheel, means for locking said pin in retracted position, means actuated by rotation of said wheel for releasing said locking means, and means for moving the released pin into engagement with the next recess in said row.

20. In a machine of the character set forth, a movable fin magazine, driving mechanism for said magazine, a member movable by said mechanism and formed with a row of recesses, a locking member and a releasing member in alignment with said row, said locking member being movable to engage any of said recesses to arrest movement of the movable member and said magazine, means to retract said locking member from engagement with a recess and to move said releasing member to a position to engage a recess, means to retain said locking member in retracted position, means associated with said releasing member for releasing the retaining means when the releasing member is moved by engagement with a recess, and means for moving the released locking member into engagement with another of said recesses.

LESTER U. LARKIN.